United States Patent
Shoji et al.

(10) Patent No.: US 11,820,425 B2
(45) Date of Patent: Nov. 21, 2023

(54) STEERING ANGLE CALCULATION APPARATUS AND MOTOR CONTROL APPARATUS INCLUDING THE SAME

(71) Applicant: JTEKT CORPORATION, Osaka (JP)

(72) Inventors: Naoki Shoji, Shiki-gun (JP); Mitsuko Yoshida, Nara (JP)

(73) Assignee: JTEKT CORPORATION, Osaka (JP)

( * ) Notice: Subject to any disclaimer, the term of this patent is extended or adjusted under 35 U.S.C. 154(b) by 242 days.

(21) Appl. No.: 16/907,844

(22) Filed: Jun. 22, 2020

(65) Prior Publication Data

US 2020/0398893 A1 Dec. 24, 2020

(30) Foreign Application Priority Data

Jun. 24, 2019 (JP) ................. 2019-116682

(51) Int. Cl.
*B62D 15/02* (2006.01)
*B62D 6/08* (2006.01)

(52) U.S. Cl.
CPC ............. *B62D 15/021* (2013.01); *B62D 6/08* (2013.01)

(58) Field of Classification Search
CPC ...... B62D 15/021; B62D 6/08; B62D 5/0412; B62D 5/0463; B62D 15/025; B62D 6/002; B62D 6/008; B62D 5/04
See application file for complete search history.

(56) References Cited

U.S. PATENT DOCUMENTS

| 2016/0016606 A1* | 1/2016 | Tsubaki | ................ | B62D 6/002 |
| | | | | 701/41 |
| 2017/0253265 A1* | 9/2017 | Nishimura | ............. | B62D 6/008 |
| 2018/0304922 A1 | 10/2018 | Hirate et al. | | |
| 2019/0009816 A1 | 1/2019 | Moreillon et al. | | |
| 2019/0092384 A1* | 3/2019 | Kodera | ................. | B62D 5/006 |

FOREIGN PATENT DOCUMENTS

| EP | 3178724 A1 | 6/2017 |
| EP | 3213979 A1 | 9/2017 |
| EP | 3321149 A1 | 5/2018 |
| EP | 3378731 A1 | 9/2018 |
| EP | 3461721 A2 | 4/2019 |
| JP | 2006-175940 A | 7/2006 |
| JP | 2017-154698 A | 9/2017 |
| JP | 2019-014468 A | 1/2019 |
| JP | 2019-059393 A | 4/2019 |

OTHER PUBLICATIONS

Nov. 2, 2020 Search Report issued in European Patent Application No. 20181411.8.
Mar. 2, 2023 Office Action issued in Japanese Patent Application No. 2019-116682.

* cited by examiner

*Primary Examiner* — Faris S Almatrahi
*Assistant Examiner* — Andrew J Cromer
(74) *Attorney, Agent, or Firm* — Oliff PLC

(57) ABSTRACT

A steering angle calculation apparatus includes an electronic control unit configured to calculate a steering angle based on a torque caused by a driver and at least one of vehicle information, surrounding environment information, and driver information.

4 Claims, 14 Drawing Sheets

STEERING ANGLE CALCULATION APPARATUS AND MOTOR CONTROL APPARATUS INCLUDING THE SAME

CROSS-REFERENCE TO RELATED APPLICATION

This application claims priority to Japanese Patent Application No. 2019-116682 filed on Jun. 24, 2019, incorporated herein by reference in its entirety.

BACKGROUND

1. Technical Field

The disclosure relates to a steering angle calculation apparatus and a motor control apparatus including the steering angle calculation apparatus.

2. Description of Related Art

Japanese Unexamined Patent Application Publication No. 2006-175940 (JP 2006-175940 A) discloses an electric power steering system including a downstream-side reference model (steering mechanism-side reference model) for defining a target steered angle of steered wheels (target steering angle) based on a steering torque detected by a torque sensor. In this downstream-side reference model, the target steered angle is calculated based on a moment of inertia of a steering member (a steering wheel and a steering shaft), a viscosity coefficient corresponding to, for example, friction of a rack shaft against a housing, a spring constant of the steering member regarded as a spring, and the steering torque.

SUMMARY

The disclosure provides a steering angle calculation apparatus capable of calculating a steering angle for use in steering control in consideration of at least one of a vehicle condition, a surrounding environment, and a driver's condition as well as a torque caused by the driver, and provides a motor control apparatus using the steering angle calculation apparatus.

A first aspect of the disclosure relates to a steering angle calculation apparatus including an electronic control unit configured to calculate a steering angle based on a torque caused by a driver and at least one of vehicle information, surrounding environment information, and driver information. In this configuration, the steering angle for use in the steering control can be calculated in consideration of at least one of the vehicle condition, the surrounding environment, and the driver's condition as well as the torque caused by the driver.

In the above-described aspect, the electronic control unit may be configured to calculate the steering angle based on an equation of motion; the equation of motion may be an equation of motion for calculating the steering angle using the torque caused by the driver and a road load torque; and the road load torque may be set based on at least one of the vehicle information, road information, and the driver information.

In the above-described aspect, the equation of motion may include a spring component and a viscosity component for generating the road load torque; the spring component may be set by correcting a basic spring component based on the at least one of the vehicle information, the surrounding environment information, and the driver information; and the viscosity component may be set by correcting a basic viscosity component based on the at least one of the vehicle information, the surrounding environment information, and the driver information.

In the above-described aspect, the basic spring component may have a linear characteristic defined by a predetermined spring constant relative to the steering angle; and the basic viscosity component may have a linear characteristic defined by a predetermined viscosity coefficient relative to a steering speed. In the above-described aspect, the electronic control unit may be configured to set the steering angle by correcting, based on the at least one of the vehicle information, the surrounding environment information, and the driver information, a basic steering angle set in accordance with the torque caused by the driver.

A second aspect of the disclosure relates to a motor control apparatus configured to control driving of an electric motor for steering angle control. The motor control apparatus includes the steering angle calculation apparatus according to the first aspect of the disclosure. The electronic control unit is further configured to generate a manual steering command value, calculate an integrated angle command value by adding the manual steering command value to an automatic steering angle command value, and perform angle control for the electric motor based on the integrated angle command value. The electronic control unit is configured to generate the steering angle as the manual steering command value.

A third aspect of the disclosure relates to a motor control apparatus including a torque detector configured to detect a steering torque; a steering angle detector configured to detect an actual steering angle; and the steering angle calculation apparatus according to the first aspect of the disclosure. The electronic control unit is further configured to set an automatic steering control amount, set an assist control amount using the steering torque, calculate an integrated control amount by summing the automatic steering control amount and the assist control amount, and perform torque control for an electric motor for steering angle control based on the integrated control amount. The electronic control unit is configured to calculate an actual manual steering angle included in the actual steering angle, the actual manual steering angle being based on manual steering and assist control, calculate an actual automatic steering angle by subtracting the actual manual steering angle from the actual steering angle, and set the automatic steering control amount using an automatic steering angle command value and the actual automatic steering angle. The electronic control unit is configured to generate the steering angle as the actual manual steering angle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
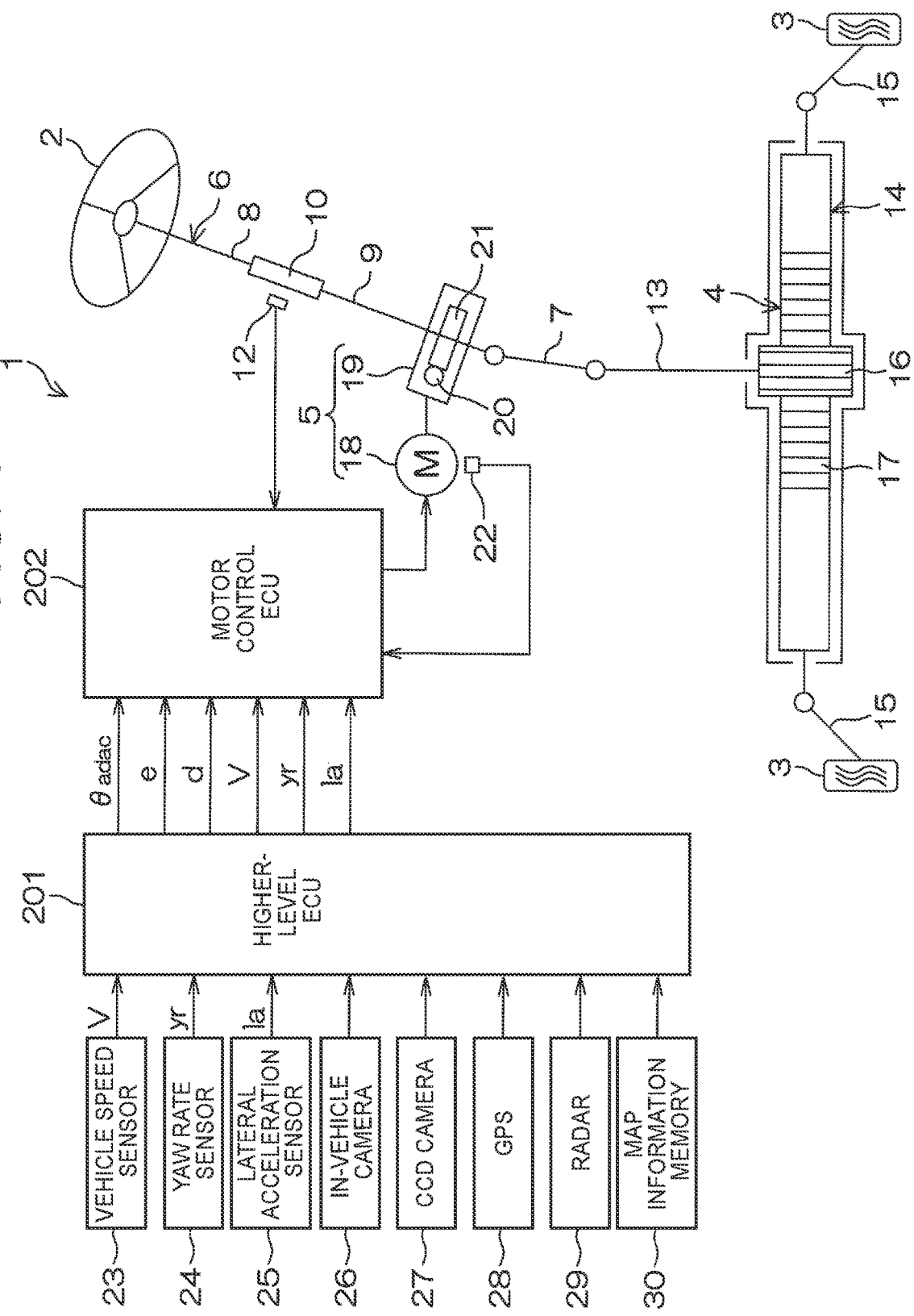
FIG. 1 is a schematic diagram illustrating the configuration of an electric power steering system according to a first embodiment of the disclosure.

Embodiments of the disclosure are described below in detail with reference to the accompanying drawings. FIG. 1 is a schematic diagram illustrating the configuration of an electric power steering system according to a first embodiment of the disclosure. An electric power steering system 1 includes a steering wheel 2, a steering operation mechanism 4, and a steering assist mechanism 5. The steering wheel 2 is a steering member used for steering a vehicle. The steering operation mechanism 4 turns steered wheels 3 in accordance with rotation of the steering wheel 2. The steering assist mechanism 5 assists a driver's steering operation. The steering wheel 2 and the steering operation mechanism 4 are mechanically coupled together via a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled together via a torsion bar 10 so as to be rotatable relative to each other. A torque sensor 12 is disposed near the torsion bar 10. The torque sensor 12 detects a steering torque (torsion bar torque) $T_{tb}$ applied to the steering wheel 2 based on a relative rotational displacement amount between the input shaft 8 and the output shaft 9. In this embodiment, the steering torque $T_{tb}$ detected by the torque sensor 12 takes, for example, a positive value as a torque for steering to the left, and a negative value as a torque for steering to the right. As the absolute value of the steering torque $T_{tb}$ increases, the magnitude of the steering torque $T_{tb}$ increases.

The steering operation mechanism 4 is a rack and pinion mechanism including a pinion shaft 13 and a rack shaft 14 serving as a steering operation shaft (in other words, a turning shaft). The steered wheels 3 are coupled to the ends of the rack shaft 14 via tie rods 15 and knuckle arms (not illustrated), respectively. The pinion shaft 13 is coupled to the intermediate shaft 7. The pinion shaft 13 rotates in accordance with a steering operation of the steering wheel 2. A pinion 16 is coupled to the distal end of the pinion shaft 13.

The rack shaft 14 linearly extends along a lateral direction of the vehicle. A rack 17 is formed in the intermediate portion of the rack shaft 14 in its axial direction. The rack 17 meshes with the pinion 16. The pinion 16 and the rack 17 convert rotation of the pinion shaft 13 into axial movement of the rack shaft 14. Through the axial movement of the rack shaft 14, the steered wheels 3 can be turned.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 into the axial movement of the rack shaft 14. Thus, the steered wheels 3 are turned. The steering assist mechanism 5 includes an electric motor 18 and a speed reducer 19. The electric motor 18 generates a steering assist force (assist torque). The speed reducer 19 amplifies a torque output from the electric motor 18, and transmits the torque to the steering operation mechanism 4. The speed reducer 19 is constituted by a worm gear mechanism including a worm gear 20 and a worm wheel 21 that meshes with the worm gear 20. The speed reducer 19 is housed in a gear housing that is a transmission mechanism housing.

A speed reducing ratio (gear ratio) of the speed reducer 19 may hereinafter be represented by "N". The speed reducing ratio N is defined as a ratio $\theta_{wg}/\theta_{ww}$ of a worm gear angle $\theta_{wg}$ to a worm wheel angle $\theta_{ww}$. The worm gear angle $\theta_{wg}$ is a rotation angle of the worm gear 20. The worm wheel angle $\theta_{ww}$ is a rotation angle of the worm wheel 21. The worm gear 20 is driven to rotate by the electric motor 18. The worm wheel 21 is coupled to the output shaft 9 so as to be rotatable together with the output shaft 9.

When the worm gear 20 is driven to rotate by the electric motor 18, the worm wheel 21 is driven to rotate. Therefore, a motor torque is applied to the steering shaft 6, and the steering shaft 6 (output shaft 9) rotates. The rotation of the steering shaft 6 is transmitted to the pinion shaft 13 via the intermediate shaft 7. The rotation of the pinion shaft 13 is converted into axial movement of the rack shaft 14. Thus, the steered wheels 3 are turned. That is, when the worm gear 20 is driven to rotate by the electric motor 18, the steering can be assisted and the steered wheels 3 can be turned by the electric motor 18. The electric motor 18 is provided with a rotation angle sensor 22 configured to detect a rotation angle of a rotor of the electric motor 18.

The torque applied to the output shaft 9 includes the motor torque generated by the electric motor 18, and a disturbance torque other than the motor torque. A disturbance torque $T_{lc}$ other than the motor torque includes the steering torque $T_{tb}$, a road load torque (road reaction torque) $T_{rl}$, and a friction torque $T_f$. The steering torque $T_{tb}$ is applied to the output shaft 9 from the steering wheel 2 due to a force applied to the steering wheel 2 by the driver, a force generated by steering inertia, and the like.

The road load torque $T_{rl}$ is applied to the output shaft 9 from the steered wheels 3 via the rack shaft 14 due to a self-aligning torque generated in a tire, a force generated by a suspension or tire/wheel alignment, a friction force of the rack and pinion mechanism, or the like. The friction torque $T_f$ is applied to the output shaft 9. The friction torque $T_f$ is not included in the steering torque $T_{tb}$ and is not included in the road load torque $T_{rl}$.

The vehicle is provided with a vehicle speed sensor 23, a yaw rate sensor 24, a lateral acceleration sensor 25, and an in-vehicle camera 26. The vehicle speed sensor 23 detects a vehicle speed V. The yaw rate sensor 24 detects a yaw rate yr of the vehicle (rotation speed of the vehicle). The lateral acceleration sensor 25 detects a lateral acceleration la of the vehicle. The in-vehicle camera 26 photographs (i.e., captures the image of) the driver. In this embodiment, the yaw rate yr and the lateral acceleration la are detected as, for example, positive values when the vehicle is turning to the left, and negative values when the vehicle is turning to the right. As the absolute values of the yaw rate yr and the lateral acceleration la increase, the magnitudes of the yaw rate and the lateral acceleration increase.

A charge coupled device (CCD) camera 27, a global positioning system (GPS) 28, a radar 29, and a map information memory 30 are mounted on the vehicle. The CCD camera 27 photographs (i.e., captures the image of) a road ahead of the vehicle in its traveling direction. The GPS 28 detects the position of the driver's vehicle (i.e., the host vehicle). The radar 29 detects a road shape and an obstacle.

The map information memory 30 stores map information. The vehicle speed sensor 23, the yaw rate sensor 24, the lateral acceleration sensor 25, the in-vehicle camera 26, the CCD camera 27, the GPS 28, the radar 29, and the map information memory 30 are connected to a higher-level electronic control unit (ECU) 201 configured to perform driving assistance control and automatic driving control. For example, the higher-level ECU 201 performs surrounding environment recognition, estimation of the position of the driver's vehicle, and route planning based on information obtained by the CCD camera 27, the GPS 28, and the radar 29 and based on the map information, and performs steering and determination of a target control value for a drive actuator, and sets an automatic steering angle command value $\theta_{adac}$ for automatic steering.

In this embodiment, automatic steering control is, for example, control for causing the vehicle to travel along a target track. The automatic steering angle command value $\theta_{adac}$ is a target value of a steering angle for causing the vehicle to automatically travel along the target track (i.e., the target route). A process for setting the automatic steering angle command value $\theta_{adac}$ is known, and therefore detailed description is omitted herein. The higher-level ECU 201 determines a danger level e of a surrounding environment based on a result of surrounding environment recognition (for example, a result of recognition of surrounding pedestrian(s), vehicle(s), and road conditions). In this embodiment, the danger level e of the surrounding environment takes a value of 0 or more and 1 or less (i.e., a value in a range of 0 to 1). As the danger level of the surrounding environment increases, the value of "e" increases. For example, when an obstacle is present in the traveling direction, the danger level e increases.

The higher-level ECU 201 determines an arousal level d of the driver based on an image of the driver photographed by the in-vehicle camera 26. In this embodiment, the arousal level d takes a value of 0 or more and 1 or less (i.e., a value in a range of 0 to 1). When the driver is sleeping, the arousal level d is 0. When the driver is fully awake, the arousal level d is 1. The higher-level ECU 201 may determine the arousal level d of the driver by a different method.

The automatic steering angle command value $\theta_{adac}$ set by the higher-level ECU 201 and the danger level e of the surrounding environment and the driver arousal level d that are determined by the higher-level ECU 201 are supplied to a motor control ECU 202 via an on-board network. The vehicle speed V detected by the vehicle speed sensor 23, the yaw rate yr detected by the yaw rate sensor 24, and the lateral acceleration la detected by the lateral acceleration sensor 25 are input to the motor control ECU 202 via the higher-level ECU 201 and the on-board network.

Figure 2:
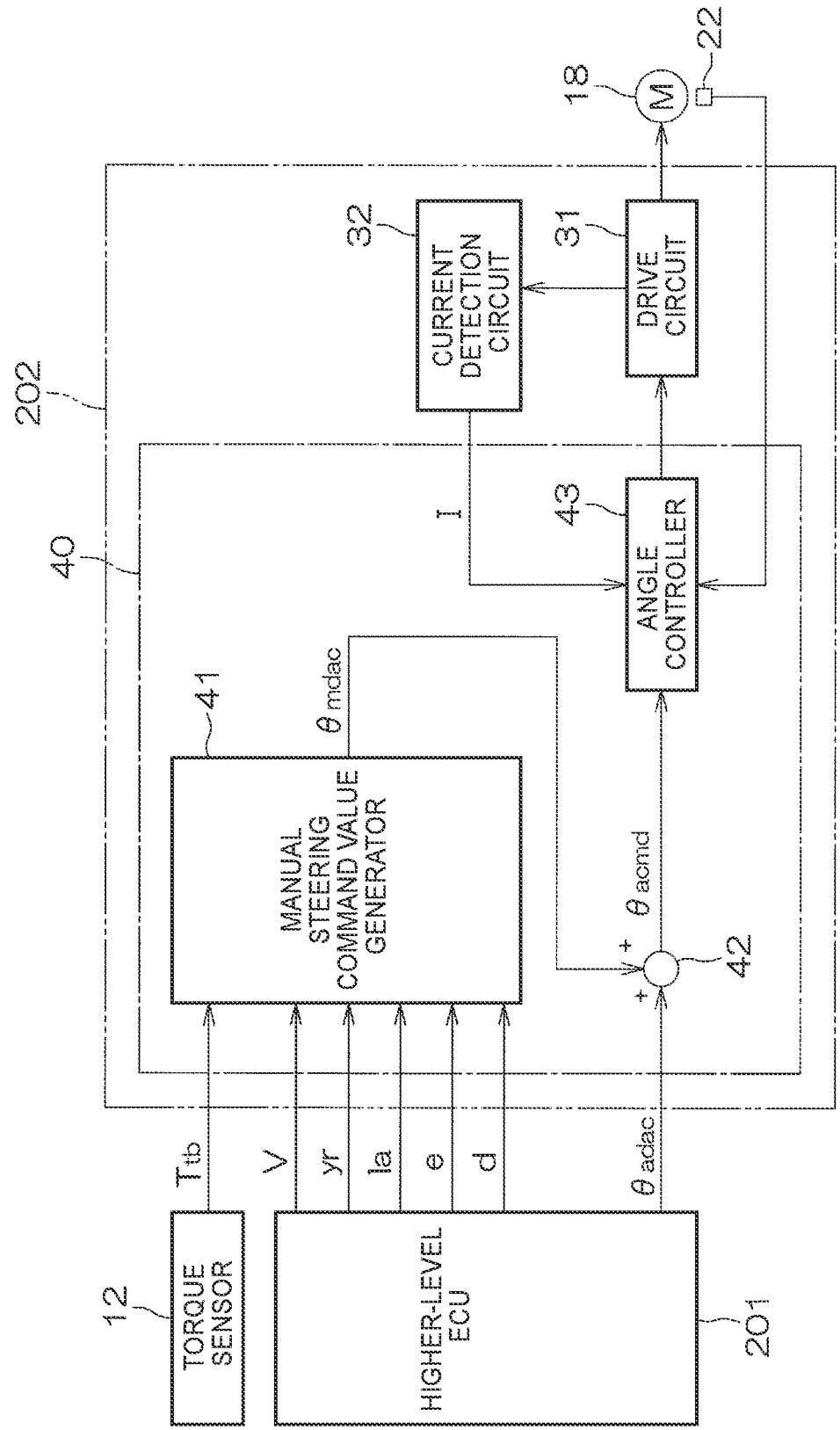
FIG. 2 is a block diagram for illustrating the electrical configuration of a motor control ECU.

The steering torque $T_{tb}$ detected by the torque sensor 12 and a signal output from the rotation angle sensor 22 are input to the motor control ECU 202. The motor control ECU 202 controls the electric motor 18 based on the input signals and the information supplied from the higher-level ECU 201. FIG. 2 is a block diagram for illustrating the electrical configuration of the motor control ECU 202.

The motor control electronic control unit (ECU) 202 includes a microcomputer 40, a drive circuit (inverter circuit) 31, and a current detection circuit 32. The drive circuit 31 is controlled by the microcomputer 40, and supplies electric power to the electric motor 18. The current detection circuit 32 detects a current flowing through the electric motor 18 (hereinafter referred to as "motor current I"). The microcomputer 40 includes a central processing unit (CPU), in other words, a processor, and memories (such as a read-only memory (ROM), a random-access memory (RAM), and a non-volatile memory). The microcomputer 40 functions as a plurality of functional processing units by executing a predetermined program. The functional processing units include a manual steering command value generator 41, an integrated angle command value calculator 42, and an angle controller (controller) 43.

The manual steering command value generator 41 sets a manual steering command value $\theta_{mdac}$ that is a target steering angle for manual steering. Details of the configuration and operation of the manual steering command value generator 41 are described later. The integrated angle command value calculator 42 calculates an integrated angle command value $\theta_{acmd}$ by adding the manual steering command value $\theta_{mdac}$ to the automatic steering angle command value $\theta_{adac}$ set by the higher-level ECU 201.

Figure 3:
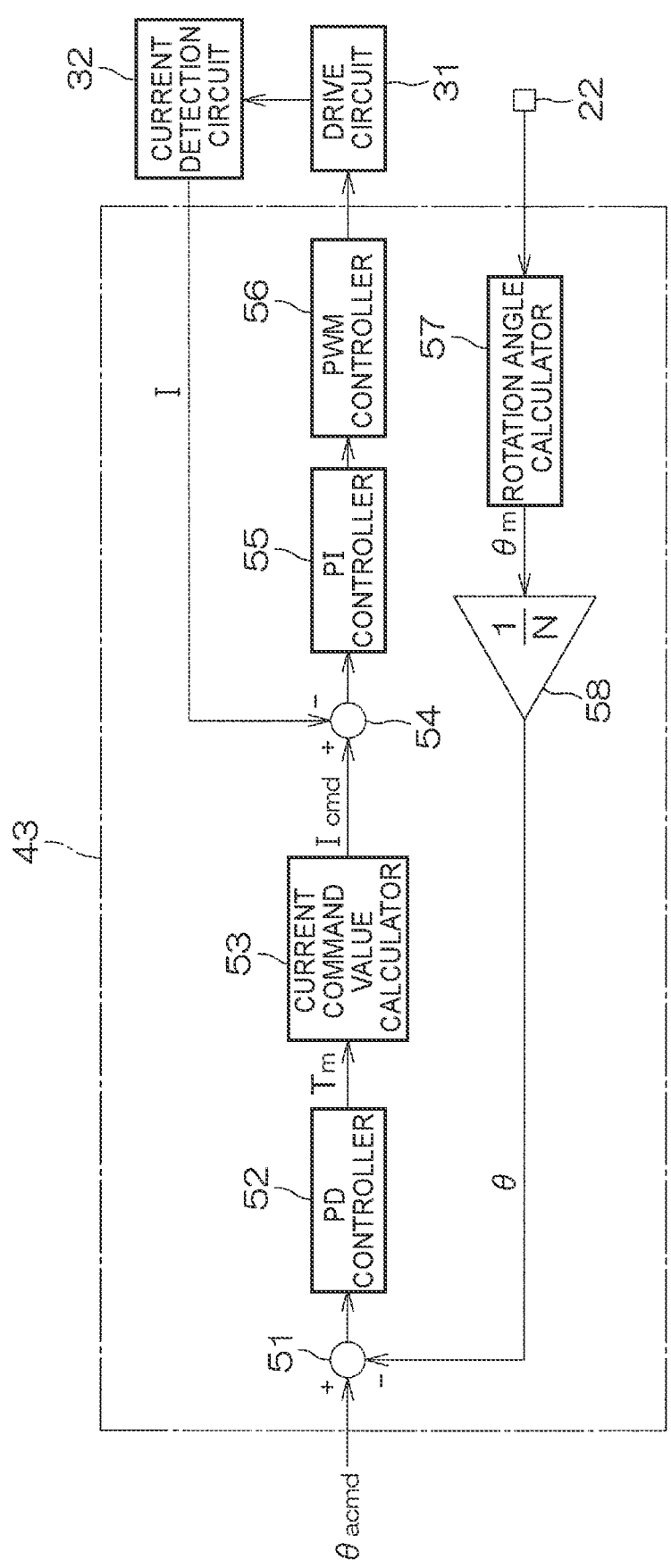
FIG. 3 is a block diagram illustrating the configuration of an angle controller.

The angle controller 43 performs angle control for the electric motor 18 based on the integrated angle command value $\theta_{acmd}$. More specifically, the angle controller 43 controls driving of the drive circuit 31 such that a steering angle $\theta$ (rotation angle $\theta$ of the output shaft 9) is closer to (i.e., approaches) the integrated angle command value $\theta_{acmd}$. FIG. 3 is a block diagram illustrating an example of the configuration of the angle controller 43. The angle controller 43 includes an angle deviation calculator 51, a proportional-derivative (PD) controller 52, a current command value calculator 53, a current deviation calculator 54, a proportional-integral (PI) controller 55, a pulse width modulation (PWM) controller 56, a rotation angle calculator 57, and a speed reducing ratio divider 58.

The rotation angle calculator 57 calculates a rotor rotation angle $\theta_m$ of the electric motor 18 based on a signal output from the rotation angle sensor 22. The speed reducing ratio divider 58 converts the rotor rotation angle $\theta_m$ calculated by the rotation angle calculator 57 into the rotation angle $\theta$ of the output shaft 9 (actual steering angle) by dividing the rotor rotation angle $\theta_m$ by the speed reducing ratio N. The angle deviation calculator 51 calculates a deviation $\Delta\theta$ ($=\theta_{acmd}-\theta$) between the integrated angle command value $\theta_{acmd}$ and the actual steering angle $\theta$. The PD controller 52 calculates a torque command value $T_m$ for the electric motor 18 by performing proportional-derivative calculation (PD calculation) on the angle deviation $\Delta\theta$ calculated by the angle deviation calculator 51.

The current command value calculator 53 calculates a motor current command value $I_{cmd}$ by dividing the torque command value $T_m$ calculated by the PD controller 52 by a torque constant $K_t$ of the electric motor 18. The current deviation calculator 54 calculates a deviation $\Delta I$ ($=I_{cmd}-I$) between the motor current command value $I_{cmd}$ obtained by the current command value calculator 53 and the motor current I detected by the current detection circuit 32.

The PI controller 55 generates a drive command value by performing proportional-integral calculation (PI calculation) on the current deviation $\Delta I$ calculated by the current deviation calculator 54. The drive command value is used such that the motor current I flowing through the electric motor 18 matches the motor current command value $I_{cmd}$. The PWM controller 56 generates a PWM control signal at a duty ratio corresponding to the drive command value, and supplies the PWM control signal to the drive circuit 31. Thus, electric power corresponding to the drive command value is supplied to the electric motor 18.

Figure 4:
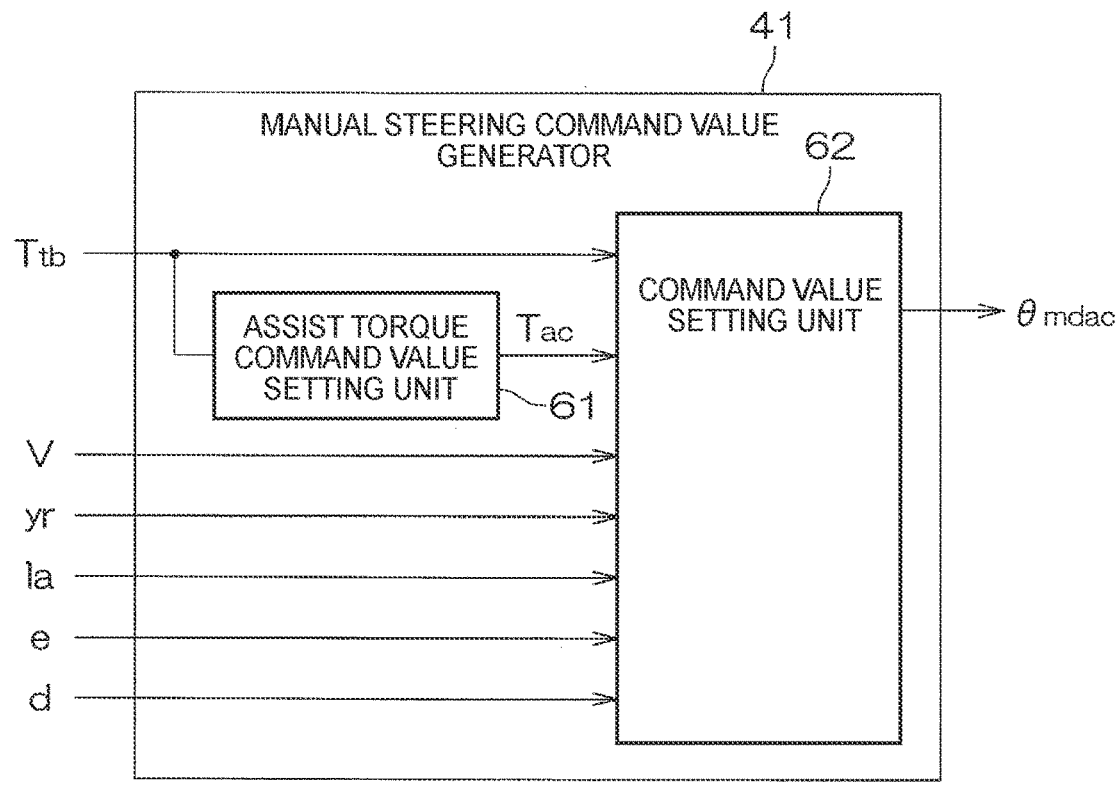
FIG. 4 is a block diagram illustrating the configuration of a manual steering command value generator.

Next, the configuration and operation of the manual steering command value generator 41 are described in detail. FIG. 4 is a block diagram illustrating the configuration of the manual steering command value generator 41. The manual steering command value generator 41 includes an assist torque command value setting unit 61 and a command value setting unit 62. The command value setting unit 62 is an example of a "steering angle calculator" of the disclosure. The command value setting unit 62 is also an example of a "manual steering command value generator" of the disclosure.

Figure 5:
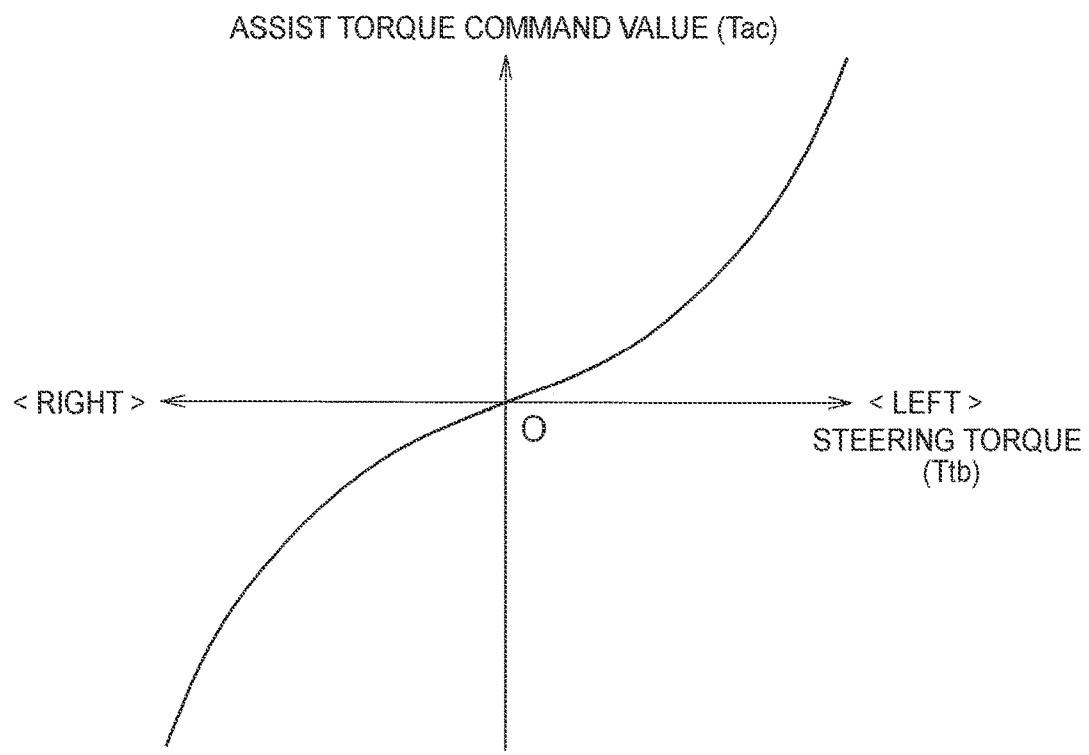
FIG. 5 is a graph illustrating a setting example of an assist torque command value $T_{ac}$ relative to a steering torque $T_{tb}$.

The assist torque command value setting unit 61 sets an assist torque command value $T_{ac}$ that is a target value of an assist torque necessary for manual operation. The assist torque command value setting unit 61 sets the assist torque command value $T_{ac}$ based on the steering torque $T_{tb}$ detected by the torque sensor 12. FIG. 5 illustrates a setting example of the assist torque command value $T_{ac}$ relative to the steering torque $T_{tb}$.

The assist torque command value $T_{ac}$ takes a positive value when the electric motor 18 generates a steering assist force for steering to the left, and takes a negative value when the electric motor 18 generates a steering assist force for steering to the right. The assist torque command value $T_{ac}$ takes a positive value when the steering torque $T_{tb}$ is a positive value, and takes a negative value when the steering torque $T_{tb}$ is a negative value. The assist torque command value $T_{ac}$ is set such that its absolute value increases as the absolute value of the steering torque $T_{tb}$ increases.

The assist torque command value setting unit 61 may calculate the assist torque command value $T_{ac}$ by multiplying the steering torque $T_{tb}$ by a preset constant. When the driver operates the steering wheel 2, the command value setting unit 62 basically sets a steering angle (i.e., a rotation angle $\theta$ of the output shaft 9) corresponding to the operation of the steering wheel 2 as the manual steering command value $\theta_{mdac}$, based on a torque $T_{in}$ caused by the driver. The torque $T_{in}$ caused by the driver is hereinafter referred to as "input torque $T_{in}$". In this embodiment, the input torque $T_{in}$ is the sum ($T_{tb}+T_{ac}$) of the steering torque $T_{tb}$ detected by the torque sensor 12 and the assist torque command value $T_{ac}$ set by the assist torque command value setting unit 61.

The command value setting unit 62 sets a manual steering command value $\theta_{mdac}$ appropriate for at least one of a vehicle condition, a surrounding environment, and a driver's condition in consideration of at least one of vehicle information, surrounding environment information, and driver information. Examples of the vehicle information include a vehicle speed, a yaw rate, and a lateral acceleration. In this embodiment, the vehicle speed V, the yaw rate yr, and the lateral acceleration la supplied from the higher-level ECU 201 are used as the vehicle information.

Examples of the surrounding environment information include conditions of surrounding pedestrians, conditions of surrounding vehicles, and conditions of surrounding roads (road surfaces). In this embodiment, the danger level e of the surrounding environment that is supplied from the higher-level ECU 201 is used as the surrounding environment information. Examples of the driver's condition include an arousal level of the driver and a driving preparation status of the driver. In this embodiment, the arousal level d of the driver that is supplied from the higher-level ECU 201 is used as the driver's condition.

For example, a first method, a second method, and a third method are provided as methods for setting the manual steering command value $\theta_{mdac}$ by the command value setting unit 62. Those methods are described below. In the first method, the command value setting unit 62 sets the manual steering command value $\theta_{mdac}$ using a reference electric power steering (EPS) model illustrated in FIG. 6.

Figure 6:
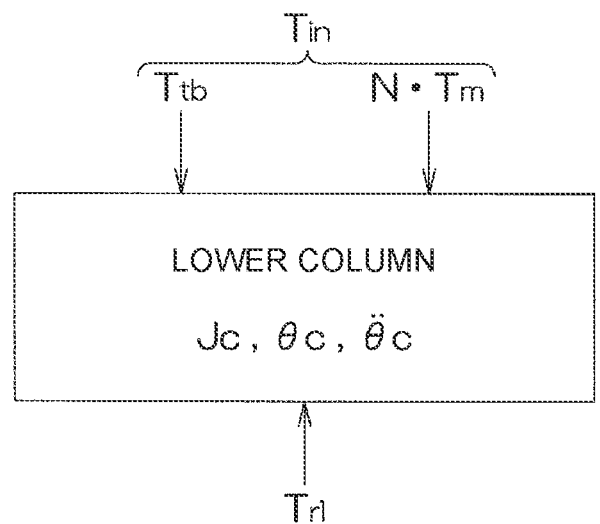
FIG. 6 is a schematic diagram illustrating an example of a reference EPS model used in a command value setting unit.

The reference EPS model of FIG. 6 is a single inertia model including a lower column. The lower column corresponds to the output shaft 9 and the worm wheel 21. In FIG. 6, $J_c$ represents inertia of the lower column, $\theta_c$ represents a rotation angle of the lower column, and $d\theta_c/dt$ represents a rotation speed of the lower column. The steering torque $T_{tb}$, a torque $N \cdot T_m$, and the road load torque (imaginary reaction torque) $T_{rl}$ are applied to the lower column. The torque $N \cdot T_m$ acts on the output shaft 9 from the electric motor 18 (hereinafter referred to as "output shaft-conversion motor torque"). In the reference EPS model, the input torque $T_{in}$ is the sum $(T_{tb}+N \cdot T_m)$ of the steering torque $T_{tb}$ and the output shaft-conversion motor torque $N \cdot T_m$.

An equation of motion of the reference EPS model is represented by Expression (1).

$$J_c \cdot d^2\theta_c/dt^2 = T_{in} + T_{rl} \quad (1)$$

The road load torque $T_{rl}$ is represented by Expression (2) using a spring component $T_{rl,k}$ and a viscosity component $T_{rl,c}$.

$$T_{rl} = -T_{rl,k} - T_{rl,c} \quad (2)$$

Thus, the equation of motion in Expression (1) can be represented by Expression (3).

$$J_c \cdot d^2\theta_c/dt^2 = T_{in} - T_{rl,k} - T_{rl,c} \quad (3)$$

The spring component $T_{rl,k}$ is set by correcting a basic spring component $T_{base,k}$ with a spring component correction gain $G_k$ as represented by Expression (4).

$$T_{rl,k} = T_{base,k} \times G_k \quad (4)$$

For example, the basic spring component $T_{base,k}$ is represented by Expression (5), provided that $k_{base}$ is a preset spring constant.

$$T_{base,k} = k_{base} \cdot \theta_c \quad (5)$$

Figure 7:
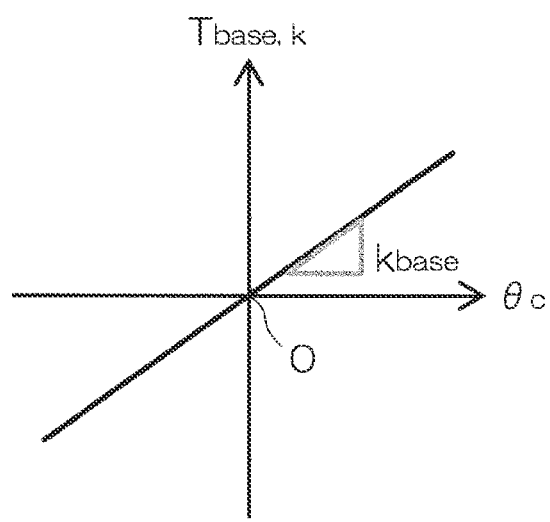
FIG. 7 is a graph illustrating a setting example of a basic spring component $T_{base,k}$ relative to a lower column rotation angle $\theta_c$.

In this case, the lower column rotation angle $\theta_c$ and the basic spring component $T_{base,k}$ have a linear relationship as illustrated in FIG. 7. For example, the spring component correction gain $G_k$ is represented by Expression (6).

$$G_k = G_{k,v} \cdot G_{k,yr} \cdot G_{k,la} \cdot G_{k,e} \cdot G_{k,d} \quad (6)$$

Figure 8A:
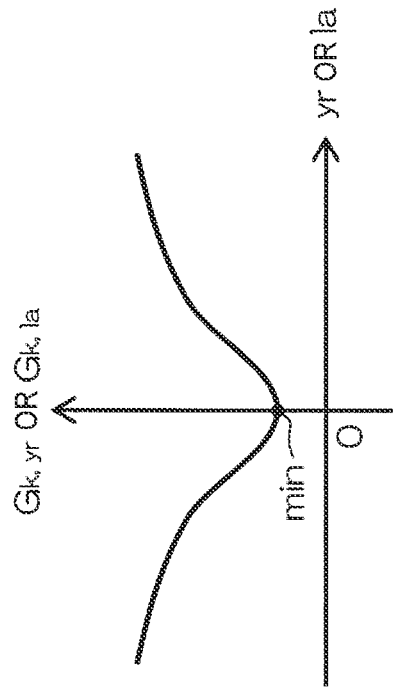
FIG. 8A is a graph illustrating a setting example of a spring component correction gain $G_{k,v}$ based on a vehicle speed V.

The symbol $G_{k,v}$ represents a spring component correction gain based on the vehicle speed V. The symbol $G_{k,yr}$ represents a spring component correction gain based on the yaw rate yr. The symbol $G_{k,la}$ represents a spring component correction gain based on the lateral acceleration la. The symbol $G_{k,d}$ represents a spring component correction gain based on the danger level e. The symbol $G_{k,d}$ represents a spring component correction gain based on the arousal level d. FIG. 8A is a graph illustrating a setting example of the spring component correction gain $G_{k,v}$ based on the vehicle speed V. When the vehicle speed V is 0, the correction gain $G_{k,v}$ is set to a predetermined maximum value max ($=G_{k,v,max}$). When the vehicle speed V is V1 or −V1, the correction gain $G_{k,v}$ is set to a predetermined minimum value min ($=G_{k,v,min}$). In a range in which the absolute value of the vehicle speed V is equal to or smaller than V1, the correction gain $G_{k,v}$ is set to decrease as the absolute value of the vehicle speed V increases. In a range in which the absolute value of the vehicle speed V is larger than V1, the correction gain $G_{k,v}$ is set to increase as the absolute value of the vehicle speed V increases.

At a low speed at which the absolute value of the vehicle speed V is equal to or smaller than V1, the basic spring component $T_{base,k}$ can be corrected such that the spring component $T_{rl,k}$ decreases as the absolute value of the vehicle speed V increases. At a medium or high speed at which the absolute value of the vehicle speed V is larger than V1, the basic spring component $T_{base,k}$ can be corrected such that the spring component $T_{rl,k}$ increases as the absolute value of the vehicle speed V increases.

Figure 8B:
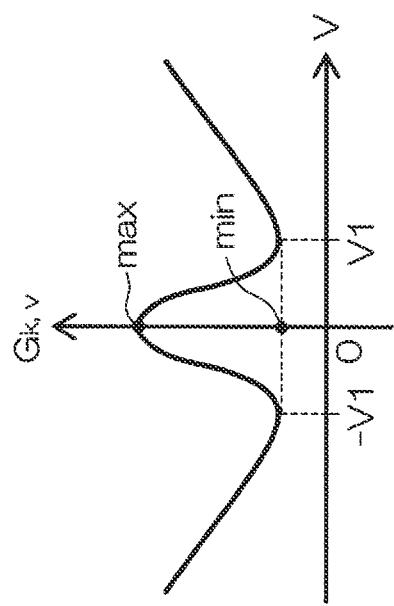
FIG. 8B is a graph illustrating setting examples of a spring component correction gain $G_{k,yr}$ based on a yaw rate yr and a spring component correction gain $G_{k,la}$ based on a lateral acceleration la.

FIG. 8B is a graph illustrating setting examples of the spring component correction gain $G_{k,yr}$ based on the yaw rate yr and the spring component correction gain $G_{k,la}$ based on the lateral acceleration la. When the yaw rate yr is 0, the correction gain $G_{k,yr}$ is set to a predetermined minimum value min ($=G_{k,yr,min}$). The correction gain $G_{k,yr}$ is set to increase as the absolute value of the yaw rate yr increases.

Figure 8C:
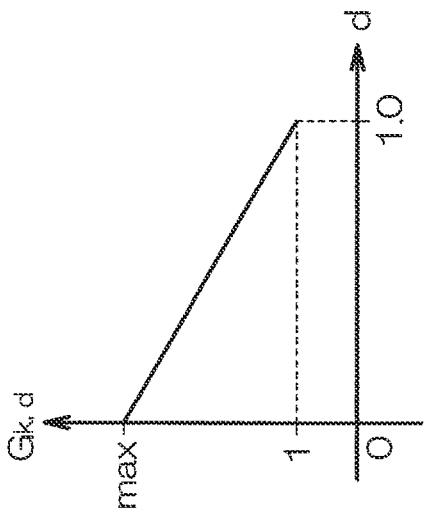
FIG. 8C is a graph illustrating a setting example of a spring component correction gain $G_{k,e}$ based on a danger level e.

The setting example of the spring component correction gain $G_{k,la}$ based on the lateral acceleration la is similar to the setting example of the spring component correction gain $G_{k,yr}$ based on the yaw rate yr, and therefore its description is omitted. Thus, the basic spring component $T_{base,k}$ can be corrected such that the spring component $T_{rl,k}$ increases as the absolute value of the yaw rate yr or the lateral acceleration la increases. FIG. 8C is a graph illustrating a setting example of the spring component correction gain $G_{k,e}$ based on the danger level e. When the danger level e is 0, the correction gain $G_{k,e}$ is set to 1. When the danger level e is 1, the correction gain $G_{k,e}$ is set to a predetermined maximum value max ($=G_{k,e,max}$). In a range in which the danger level e is 0 to 1, the correction gain $G_{k,e}$ is set to a larger value as the danger level e increases. Thus, the basic spring component $T_{base,k}$ can be corrected such that the spring component $T_{rl,k}$ increases as the danger level e increases.

Figure 8D:
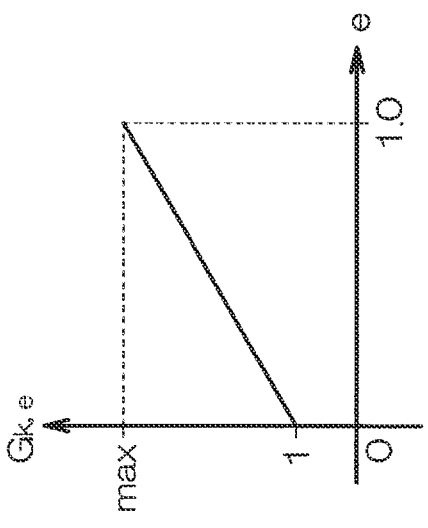
FIG. 8D is a graph illustrating a setting example of a spring component correction gain $G_{k,d}$ based on an arousal level d.

FIG. 8D is a graph illustrating a setting example of the spring component correction gain $G_{k,d}$ based on the arousal level d. When the arousal level d is 0, the correction gain $G_{k,d}$ is set to a predetermined maximum value max ($=G_{k,d,max}$). When the arousal level d is 1, the correction gain $G_{k,d}$ is set to 1. In a range in which the arousal level d is 0 to 1, the correction gain $G_{k,d}$ is set to a smaller value as the arousal level d increases. Thus, the basic spring component $T_{base,k}$ can be corrected such that the spring component $T_{rl,k}$ increases as the arousal level d decreases.

The viscosity component $T_{rl,c}$ is set by correcting a basic viscosity component $T_{base,c}$ with a viscosity component correction gain $G_c$ as represented by Expression (7).

$$T_{rl,c} = T_{base,c} \times G_c \quad (7)$$

The basic viscosity component $T_{base,c}$ is represented by Expression (8), provided that $c_{base}$ is a preset viscosity coefficient (in other words, a preset viscosity constant).

$$T_{base,c} = c_{base} \cdot d\theta_c/dt \quad (8)$$

Figure 9:
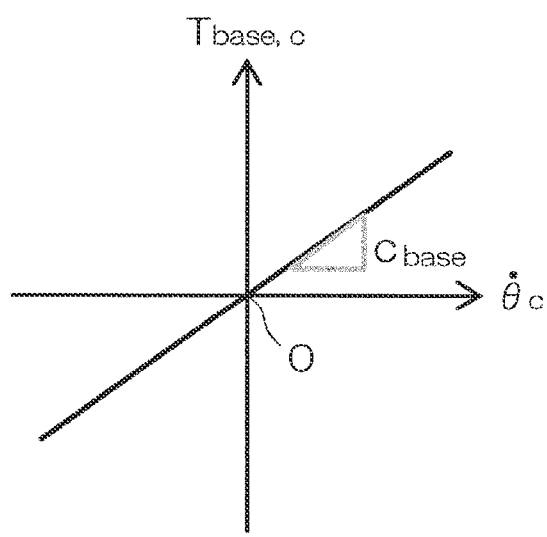
FIG. 9 is a graph illustrating a setting example of a basic viscosity component $T_{base,c}$ relative to a lower column rotation speed $d\theta_c/dt$.

In this case, the lower column rotation speed $d\theta_c/dt$ and the basic viscosity component $T_{base,c}$ have a linear relationship as illustrated in FIG. 9. For example, the viscosity component correction gain $G_c$ is represented by Expression (9).

$$G_c = G_{c,v} \cdot G_{c,yr} \cdot G_{c,la} \cdot G_{c,e} \cdot G_{c,d} \quad (9)$$

The symbol $G_{c,v}$ represents a viscosity component correction gain based on the vehicle speed V. The symbol $G_{c,yr}$ represents a viscosity component correction gain based on the yaw rate yr. The symbol $G_{c,la}$ represents a viscosity component correction gain based on the lateral acceleration la. The symbol $G_{c,e}$ represents a viscosity component correction gain based on the danger level e. The symbol $G_{c,d}$ represents a viscosity component correction gain based on the arousal level d. FIG. 10A is a graph illustrating a setting example of the viscosity component correction gain $G_{c,v}$ based on the vehicle speed V. When the vehicle speed V is 0, the correction gain $G_{c,v}$ is set to a predetermined maximum value max ($=G_{c,v,max}$). The correction gain $G_{c,v}$ is set to decrease as the absolute value of the vehicle speed V increases. Thus, the basic viscosity component $T_{base,c}$ can be corrected such that the viscosity component $T_{rl,c}$ decreases as the absolute value of the vehicle speed V increases.

Figure 10B:
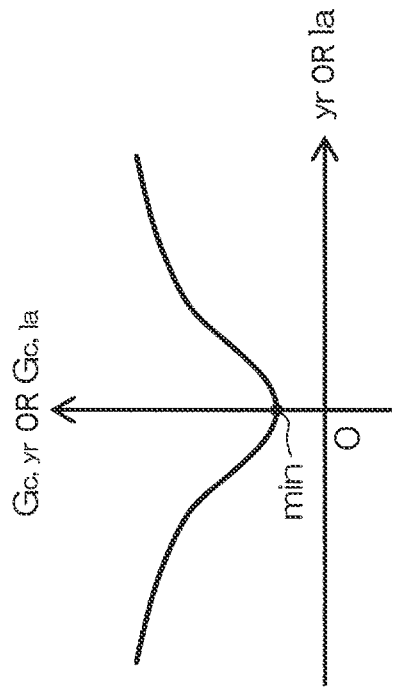
FIG. 10B is a graph illustrating setting examples of a viscosity component correction gain $G_{c,yr}$ based on the yaw rate yr and a viscosity component correction gain $G_{c,la}$ based on the lateral acceleration la.

FIG. 10B is a graph illustrating setting examples of the viscosity component correction gain $G_{c,yr}$ based on the yaw rate yr and the viscosity component correction gain $G_{c,la}$ based on the lateral acceleration la. When the yaw rate yr is 0, the correction gain $G_{c,yr}$ is set to a predetermined minimum value min ($=G_{c,yr,min}$). The correction gain $G_{c,yr}$ is set to increase as the absolute value of the yaw rate yr increases.

The setting example of the viscosity component correction gain $G_{c,la}$ based on the lateral acceleration la is similar to the setting example of the viscosity component correction gain $G_{c,yr}$ based on the yaw rate yr, and therefore its description is omitted. Thus, the basic viscosity component $T_{base,c}$ can be corrected such that the viscosity component $T_{rl,c}$ increases as the absolute value of the yaw rate yr or the lateral acceleration la increases. FIG. 10C is a graph illustrating a setting example of the viscosity component correction gain $G_{c,e}$ based on the danger level e. When the danger level e is 0, the correction gain $G_{c,e}$ is set to 1. When the danger level e is 1, the correction gain $G_{c,e}$ is set to a predetermined maximum value max ($=G_{c,e,max}$). In a range in which the danger level e is 0 to 1, the correction gain $G_{c,e}$ is set to a larger value as the danger level e increases. Thus, the basic viscosity component $T_{base,c}$ can be corrected such that the viscosity component $T_{rl,c}$ increases as the danger level e increases.

Figure 10D:
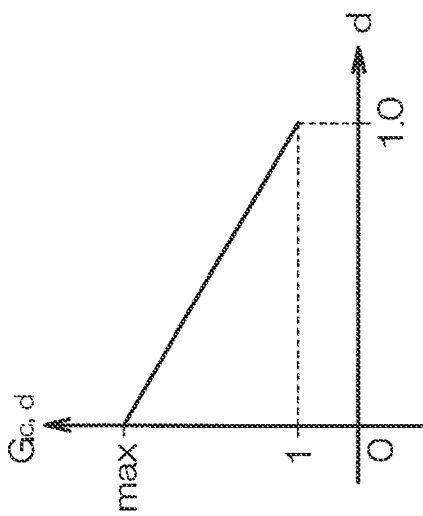
FIG. 10D is a graph illustrating a setting example of a viscosity component correction gain $G_{c,d}$ based on the arousal level d.
Figure 10A:
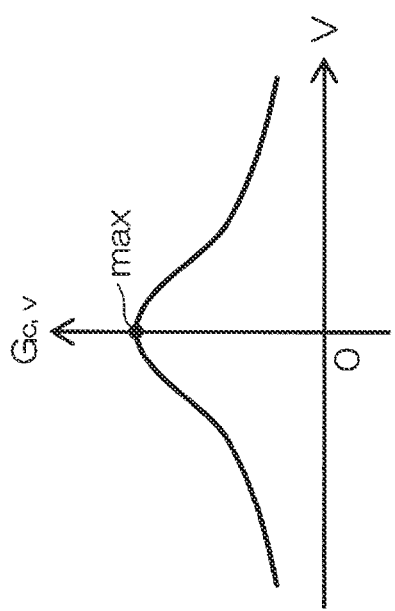
FIG. 10A is a graph illustrating a setting example of a viscosity component correction gain $G_{c,v}$ based on the vehicle speed V.
Figure 10C:
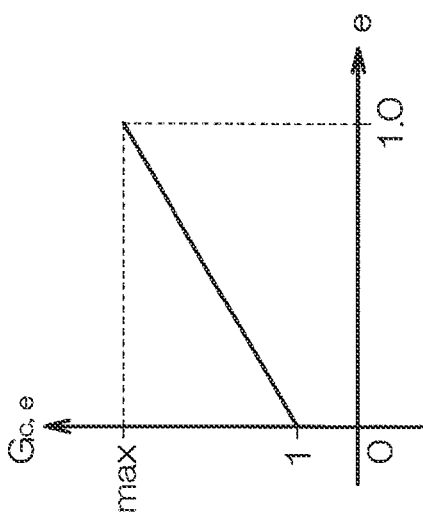
FIG. 10C is a graph illustrating a setting example of a viscosity component correction gain $G_{c,e}$ based on the danger level e.

FIG. 10D is a graph illustrating a setting example of the viscosity component correction gain $G_{c,d}$ based on the arousal level d. When the arousal level d is 0, the correction gain $G_{c,d}$ is set to a predetermined maximum value max ($=G_{c,d,max}$). When the arousal level d is 1, the correction gain $G_{c,d}$ is set to 1. In a range in which the arousal level d is 0 to 1, the correction gain $G_{c,d}$ is set to a smaller value as the arousal level d increases. Thus, the basic viscosity component $T_{base,c}$ can be corrected such that the viscosity component $T_{rl,c}$ increases as the arousal level d decreases.

On the basis of Expressions (4) to (9), the equation of motion in Expression (3) is represented by Expression (10).

$$J_c \cdot d^2\theta_c/dt^2 = (T_{tb} + N \cdot T_m) - \{(k_{base} \cdot \theta_c) \cdot G_{k,v} \cdot G_{k,yr} \cdot G_{k,la} \cdot G_{k,e} \cdot G_{k,d}\} - \{(c_{base} \cdot d\theta_c/dt) \cdot G_{c,v} \cdot G_{c,yr} \cdot G_{c,la} \cdot G_{c,e} \cdot G_{c,d}\} \quad (10)$$

The command value setting unit 62 calculates the rotation angle $\theta_c$ of the lower column by substituting the steering torque $T_{tb}$ detected by the torque sensor 12 for $T_{tb}$ in Expression (10), substituting the assist torque command value $T_{ac}$ set by the assist torque command value setting unit 61 for $N \cdot T_m$ in Expression (10), and solving the differential equation of Expression (10). The command value setting unit 62 sets the obtained rotation angle $\theta_c$ of the lower column as the manual steering command value $\theta_{mdac}$.

Figure 11:
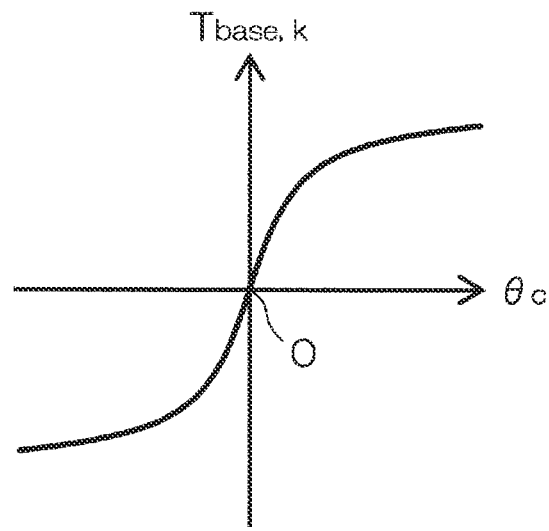
FIG. 11 is a graph illustrating another setting example of the basic spring component $T_{base,k}$ relative to the lower column rotation angle $\theta_c$.

In the first method, the basic spring component $T_{base,k}$ that changes linearly relative to the column rotation angle $\theta_c$ as illustrated in FIG. 7 is used as the basic spring component $T_{base,k}$ in Expression (4) (see Expression (5)). A basic spring component $T_{base,k}$ that changes nonlinearly relative to the column rotation angle $\theta_c$ as illustrated in FIG. 11 may be used as the basic spring component $T_{base,k}$. In this case, the basic spring component $T_{base,k}$ is represented by Expression (11) when the spring constant is represented by a function $F(\theta_c)$ of the column rotation angle $\theta_c$.

$$T_{base,k} = F(\theta_c) \cdot \theta_c \quad (11)$$

In this case, $k_{base}$ in Expression (10) is replaced with $F(\theta_c)$. Regarding the basic spring component $T_{base,k}$ ($=F(\theta_c)$ ·$\theta_c$) in this case, a basic spring component $T_{base,k}$ corresponding to a previous value $\theta_{c(n-1)}$ of the column rotation angle $\theta_c$ can be used as a current basic spring component $T_{base,k}$.

Figure 12:
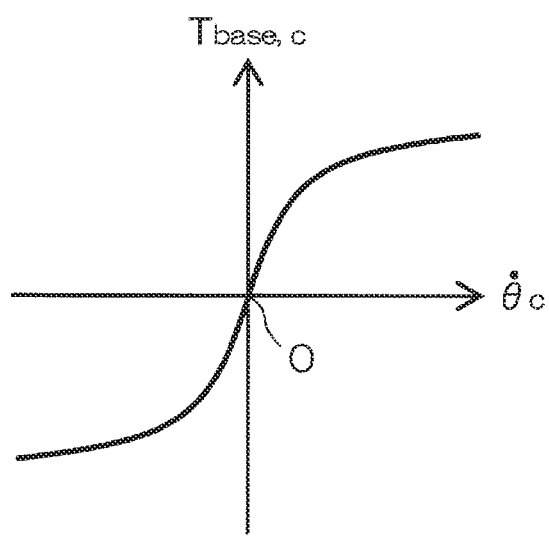
FIG. 12 is a graph illustrating another setting example of the basic viscosity component $T_{base,c}$ relative to the lower column rotation speed $d\theta_c/dt$.

In the first method, the basic viscosity component $T_{base,c}$ that changes linearly relative to the column rotation speed $d\theta_c/dt$ as illustrated in FIG. 9 is used as the basic viscosity component $T_{base,c}$ in Expression (7) (see Expression (8)). A basic viscosity component $T_{base,c}$ that changes nonlinearly relative to the column rotation speed $d\theta_c/dt$ as illustrated in FIG. 12 may be used as the basic viscosity component $T_{base,c}$. In this case, the basic viscosity component $T_{base,c}$ is represented by Expression (12) when the viscosity coefficient is represented by a function $F(d\theta_c/dt)$ of the column rotation speed $d\theta_c/dt$.

$$T_{base,c} = F(d\theta_c/dt) \cdot d\theta_c/dt \quad (12)$$

In this case, $c_{base}$ in Expression (10) is replaced with $F(d\theta_c/dt)$. Regarding the basic viscosity component $T_{base,c}$ ($=F(d\theta_c/dt) \cdot d\theta_c/dt$) in this case, a basic viscosity component $T_{base,c}$ corresponding to a previous value $d\theta_c/dt_{(n-1)}$ of the column rotation speed $d\theta_c/dt$ can be used as a current basic viscosity component $T_{base,c}$.

In the first method, the spring component correction gain $G_k$ is set based on the five kinds of correction gains $G_{k,v}$, $G_{k,yr}$, $G_{k,la}$, $G_{k,e}$, and $G_{k,d}$. The spring component correction gain $G_k$ may be set based on any one correction gain selected from among the five kinds of correction gains, or any combination of two or more correction gains selected from among the five kinds of correction gains. For example, the spring component correction gain $G_k$ may be set based on Expression (13) or (14).

$$G_k = G_{k,v} \cdot G_{k,yr} \cdot G_{k,e} \quad (13)$$

$$G_k = G_{k,v} \cdot G_{k,la} \cdot G_{k,d} \quad (14)$$

The viscosity component correction gain $G_c$ is set based on the five kinds of correction gains $G_{c,v}$, $G_{c,yr}$, $G_{c,la}$, $G_{c,e}$, and $G_{c,d}$. The viscosity component correction gain $G_c$ may be set based on any one correction gain selected from among the five kinds of correction gains, or any combination of two or more correction gains selected from among the five kinds of correction gains.

For example, the viscosity component correction gain $G_c$ may be set based on Expression (15) or (16).

$$G_c = G_{c,v} \cdot G_{c,yr} \cdot G_{c,e} \quad (15)$$

$$G_c = G_{c,v} \cdot G_{c,la} \cdot G_{c,d} \quad (16)$$

In the second method as well, the command value setting unit 62 sets the manual steering command value $\theta_{mdac}$ using the reference EPS model illustrated in FIG. 6. In the second method as well, the equation of motion of the reference EPS model is represented by Expression (3).

In the second method, the spring component $T_{rl,k}$ on the right-hand side of Expression (3) is set by correcting the basic spring component $T_{base,k}$ with a spring component correction torque $T_k$ as represented by Expression (17). The viscosity component $T_{rl,c}$ on the right-hand side of Expression (3) is set by correcting the basic viscosity component $T_{base,c}$ with a viscosity component correction torque $T_c$ as represented by Expression (18).

$$T_{rl,k} = T_{base,k} + T_k \quad (17)$$

$$T_{rl,c} = T_{base,c} + T_c \quad (18)$$

The basic spring component $T_{base,k}$ and the basic viscosity component $T_{base,c}$ are represented by Expression (5) and Expression (8), respectively. For example, the spring component correction torque $T_k$ in Expression (17) is represented by Expression (19). For example, the viscosity component correction torque $T_c$ in Expression (18) is represented by Expression (20).

$$T_k = k_v \cdot \theta_c + k_{yr} \cdot \theta_c + k_{la} \cdot \theta_c + k_e \cdot \theta_c + k_d \cdot \theta_c \quad (19)$$

$$T_c = c_v \cdot d\theta_c/dt + c_{yr} \cdot d\theta_c/dt + c_{la} \cdot d\theta_c/dt + c_e \cdot d\theta_c/dt + c_d \cdot d\theta_c/dt \quad (20)$$

In Expression (19), $k_v$ represents a spring constant based on the vehicle speed V, $k_{yr}$ represents a spring constant based on the yaw rate yr, $k_{la}$ represents a spring constant based on the lateral acceleration la, $k_e$ represents a spring constant based on the danger level e, and $k_d$ represents a spring constant based on the arousal level d. In Expression (20), $c_v$ represents a viscosity coefficient based on the vehicle speed V, $c_{yr}$ represents a viscosity coefficient based on the yaw rate yr, $c_{la}$ represents a viscosity coefficient based on the lateral acceleration la, $c_e$ represents a viscosity coefficient based on the danger level e, and $c_d$ represents a viscosity coefficient based on the arousal level d.

Figure 13A:
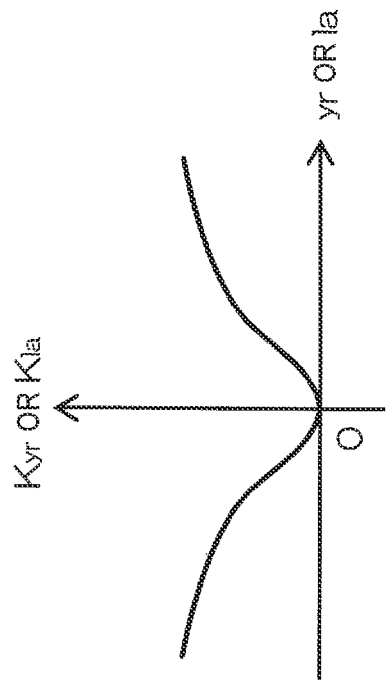
FIG. 13A is a graph illustrating a setting example of a spring constant $k_v$ based on the vehicle speed V.

FIG. 13A is a graph illustrating a setting example of the spring constant $k_v$ based on the vehicle speed V. When the vehicle speed V is 0, the spring constant $k_v$ is set to a predetermined maximum value max ($=k_{v,max}$). When the vehicle speed V is V2 or −V2, the spring constant $k_v$ is set to a predetermined minimum value min ($=k_{v,min}$). In a range in which the absolute value of the vehicle speed V is equal to or smaller than V2, the spring constant $k_v$ is set to decrease as the absolute value of the vehicle speed V increases. In a range in which the absolute value of the vehicle speed V is larger than V2, the spring constant $k_v$ is set to increase as the absolute value of the vehicle speed V increases.

At a low speed at which the absolute value of the vehicle speed V is equal to or smaller than V2, the basic spring component $T_{base,k}$ can be corrected such that the spring component $T_{rl,k}$ decreases as the absolute value of the vehicle speed V increases. At a medium or high speed at which the absolute value of the vehicle speed V is larger than V2, the basic spring component $T_{base,k}$ can be corrected such that the spring component $T_{rl,k}$ increases as the absolute value of the vehicle speed V increases.

Figure 13B:
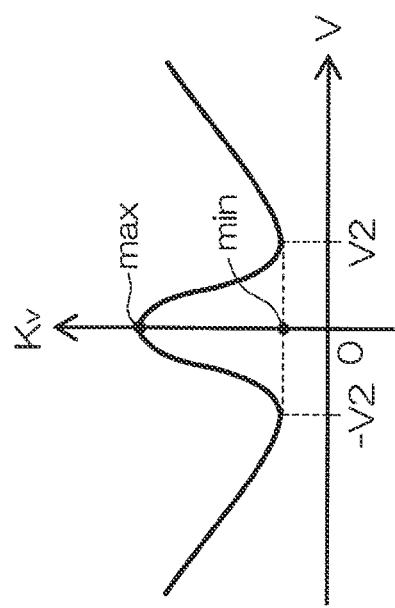
FIG. 13B is a graph illustrating setting examples of a spring constant $k_{yr}$ based on the yaw rate yr and a spring constant $k_{la}$ based on the lateral acceleration la.

FIG. 13B is a graph illustrating setting examples of the spring constant $k_{yr}$ based on the yaw rate yr and the spring constant $k_{la}$ based on the lateral acceleration la. When the yaw rate yr is 0, the spring constant $k_{yr}$ is set to 0. The spring constant $k_{yr}$ is set to increase as the absolute value of the yaw rate yr increases. The setting example of the spring constant $k_{la}$ based on the lateral acceleration la is similar to the setting example of the spring constant $k_{yr}$ based on the yaw rate yr, and therefore its description is omitted.

Figure 13C:
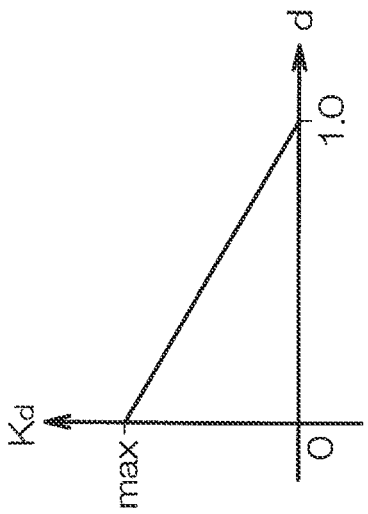
FIG. 13C is a graph illustrating a setting example of a spring constant $k_e$ based on the danger level e.

Thus, the basic spring component $T_{base,k}$ can be corrected such that the spring component $T_{rl,k}$ increases as the absolute value of the yaw rate yr or the lateral acceleration la increases. FIG. 13C is a graph illustrating a setting example of the spring constant $k_e$ based on the danger level e. When the danger level e is 0, the spring constant $k_e$ is set to 0. When the danger level e is 1, the spring constant $k_e$ is set to a predetermined maximum value max ($=k_{e,max}$). In a range in which the danger level e is 0 to 1, the spring constant $k_e$ is set to a larger value as the danger level e increases. Thus, the basic spring component $T_{base,k}$ can be corrected such that the spring component $T_{rl,k}$ increases as the danger level e increases.

Figure 13D:
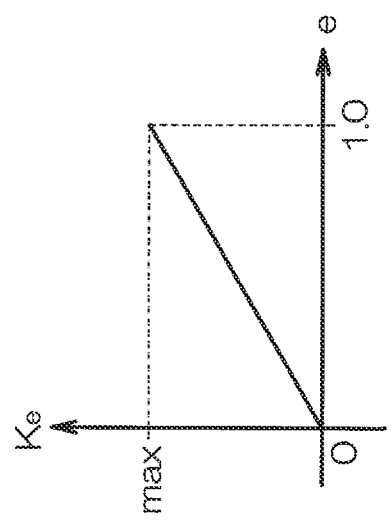
FIG. 13D is a graph illustrating a setting example of a spring constant $k_d$ based on the arousal level d.

FIG. 13D is a graph illustrating a setting example of the spring constant $k_d$ based on the arousal level d. When the arousal level d is 0, the spring constant $k_d$ is set to a predetermined maximum value max ($=k_{d,max}$). When the arousal level d is 1, the spring constant $k_d$ is set to 0. In a range in which the arousal level d is 0 to 1, the spring constant $k_d$ is set to a smaller value as the arousal level d increases. Thus, the basic spring component $T_{base,k}$ can be corrected such that the spring component $T_{rl,k}$ increases as the arousal level d decreases.

Figure 14A:
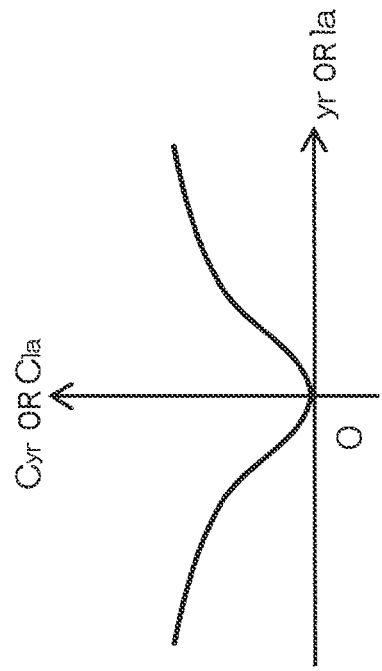
FIG. 14A is a graph illustrating a setting example of a viscosity coefficient $c_v$ based on the vehicle speed V.

FIG. 14A is a graph illustrating a setting example of the viscosity coefficient $c_v$ based on the vehicle speed V. When the vehicle speed V is 0, the viscosity coefficient $c_v$ is set to a predetermined maximum value max ($=c_{v,max}$). The viscosity coefficient $c_v$ is set to decrease as the absolute value of the vehicle speed V increases. Thus, the basic viscosity component $T_{base,c}$ can be corrected such that the viscosity component $T_{rl,c}$ decreases as the absolute value of the vehicle speed V increases.

Figure 14B:
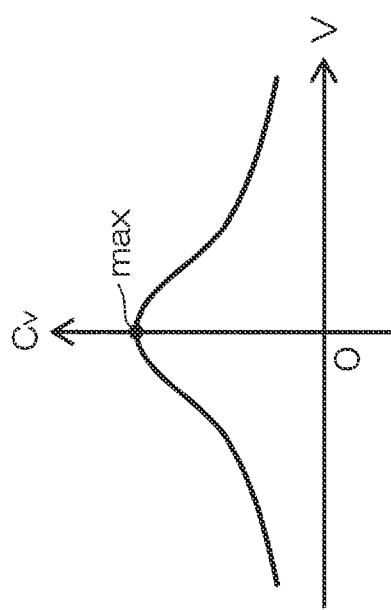
FIG. 14B is a graph illustrating setting examples of a viscosity coefficient $c_{yr}$ based on the yaw rate yr and a viscosity coefficient $c_{la}$ based on the lateral acceleration la.

FIG. 14B is a graph illustrating setting examples of the viscosity coefficient $c_{yr}$ based on the yaw rate yr and the viscosity coefficient $c_{la}$ based on the lateral acceleration la. When the yaw rate yr is 0, the viscosity coefficient $c_{yr}$ is set to 0. The viscosity coefficient $c_{yr}$ is set to increase as the absolute value of the yaw rate yr increases. The setting example of the viscosity coefficient $c_{la}$ based on the lateral acceleration la is similar to the setting example of the viscosity coefficient $c_{yr}$ based on the yaw rate yr, and therefore its description is omitted.

Figure 14C:
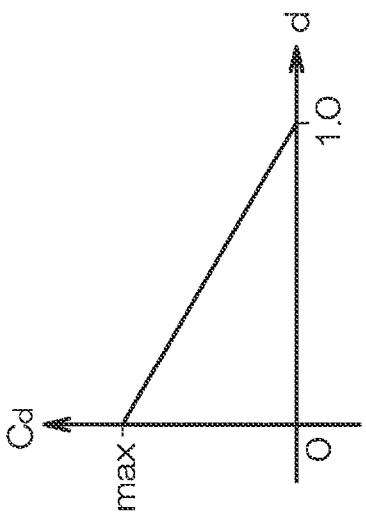
FIG. 14C is a graph illustrating a setting example of a viscosity coefficient $c_e$ based on the danger level e.

Thus, the basic viscosity component $T_{base,c}$ can be corrected such that the viscosity component $T_{rl,c}$ increases as the absolute value of the yaw rate yr or the lateral acceleration la increases. FIG. 14C is a graph illustrating a setting example of the viscosity coefficient $c_e$ based on the danger level e. When the danger level e is 0, the viscosity coefficient $c_e$ is set to 0. When the danger level e is 1, the viscosity coefficient $c_e$ is set to a predetermined maximum value max ($=c_{e,max}$). In a range in which the danger level e is 0 to 1, the viscosity coefficient $c_e$ is set to a larger value as the danger level e increases. Thus, the basic viscosity component $T_{base,c}$ can be corrected such that the viscosity component $T_{rl,c}$ increases as the danger level e increases.

Figure 14D:
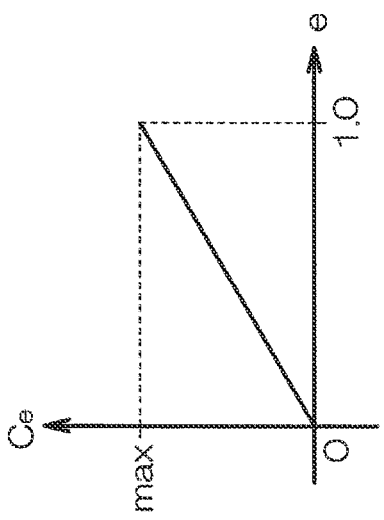
FIG. 14D is a graph illustrating a setting example of a viscosity coefficient $c_d$ based on the arousal level d.

FIG. 14D is a graph illustrating a setting example of the viscosity coefficient $c_d$ based on the arousal level d. When the arousal level d is 0, the viscosity coefficient $c_d$ is set to a predetermined maximum value max ($=c_{d,max}$). When the arousal level d is 1, the viscosity coefficient $c_d$ is set to 0. In a range in which the arousal level d is 0 to 1, the viscosity coefficient $c_d$ is set to a smaller value as the arousal level d increases. Thus, the basic viscosity component $T_{base,c}$ can be corrected such that the viscosity component $T_{rl,c}$ increases as the arousal level d decreases.

Based on Expressions (5), (8), and (17) to (20), the equation of motion in Expression (3) is represented by Expression (21).

$$J_c \cdot d^2\theta_c/dt^2 = (T_{tb} + N \cdot T_m) - \{(k_{base} + k_v + k_{yr} + k_{la} + k_e + k_d) \cdot \theta_c\} - \{(c_{base} + c_v + c_{yr} + c_{la} + c_e + c_d) \cdot d\theta_c/dt\} \quad (21)$$

The command value setting unit 62 calculates the rotation angle $\theta_c$ of the lower column by substituting the steering torque $T_{tb}$ detected by the torque sensor 12 for $T_{tb}$ in Expression (21), substituting the assist torque command value $T_{ac}$ set by the assist torque command value setting unit 61 for $N \cdot T_m$ in Expression (21), and solving the differential equation of Expression (21). The command value setting unit 62 sets the obtained rotation angle $\theta_c$ of the lower column as the manual steering command value $\theta_{mdac}$.

In the second method, the basic spring component $T_{base,k}$ that changes linearly relative to the column rotation angle $\theta_c$ as illustrated in FIG. 7 is used as the basic spring component $T_{base,k}$ in Expression (17). The basic spring component $T_{base,k}$ that changes nonlinearly relative to the column rotation angle $\theta_c$ as illustrated in FIG. 11 may be used instead. In this case, the basic spring component $T_{base,k}$ is represented by Expression (11) when the spring constant is represented by the function $F(\theta_c)$ of the column rotation angle $\theta_c$. In this case, $k_{base}$ in Expression (21) is replaced with $F(\theta_c)$.

In the second method, the basic viscosity component $T_{base,c}$ that changes linearly relative to the column rotation speed $d\theta_c/dt$ as illustrated in FIG. 9 is used as the basic viscosity component $T_{base,c}$ in Expression (18). The basic viscosity component $T_{base,c}$ that changes nonlinearly relative to the column rotation speed $d\theta_c/dt$ as illustrated in FIG. 12 may be used instead. In this case, the basic viscosity component $T_{base,c}$ is represented by Expression (12) when the viscosity coefficient is represented by the function $F(d\theta_c/dt)$ of the column rotation speed $d\theta_c/dt$. In this case, $c_{base}$ in Expression (21) is replaced with $F(d\theta_c/dt)$.

In the second method, the spring component correction torque $T_k$ is set based on the five kinds of correction torques $k_v \cdot \theta_c$, $k_{yr} \cdot \theta_c$, $k_{la} \cdot \theta_c$, $k_e \cdot \theta_c$, and $k_d \cdot \theta_c$. The spring component correction torque $T_k$ may be set based on any one correction torque selected from among the five kinds of correction torques, or any combination of two or more correction torques selected from among the five kinds of correction torques. For example, the spring component correction torque $T_k$ may be set based on Expression (22) or (23).

$$T_k = k_v \cdot \theta_c + k_{yr} \cdot \theta_c + k_e \cdot \theta_c \quad (22)$$

$$T_k = k_v \cdot \theta_c + k_{la} \cdot \theta_c + k_d \cdot \theta_c \quad (23)$$

The viscosity component correction torque $T_c$ is set based on the five kinds of correction torques $c_v \cdot d\theta_c/dt$, $c_{yr} \cdot d\theta_c/dt$, $c_{la} \cdot d\theta_c/dt$, $c_e \cdot d\theta_c/dt$, and $c_d \cdot d\theta_c/dt$. The viscosity component correction torque $T_c$ may be set based on any one correction torque selected from among the five kinds of correction torques, or any combination of two or more correction torques selected from among the five kinds of correction torques.

For example, the viscosity component correction torque $T_c$ may be set based on Expression (24) or (25).

$$T_c = c_v \cdot d\theta_c/dt + c_{yr} \cdot d\theta_c/dt + c_e \cdot d\theta_c/dt \quad (24)$$

$$T_c = c_v \cdot d\theta_c/dt + c_{la} \cdot d\theta_c/dt + c_d \cdot d\theta_c/dt \quad (25)$$

In the third method, the command value setting unit 62 sets the manual steering command value $\theta_{mdac}$ based on Expression (26).

$$\theta_{mdac} = G \cdot \theta_{mdac,base} \quad (26)$$

Figure 15:
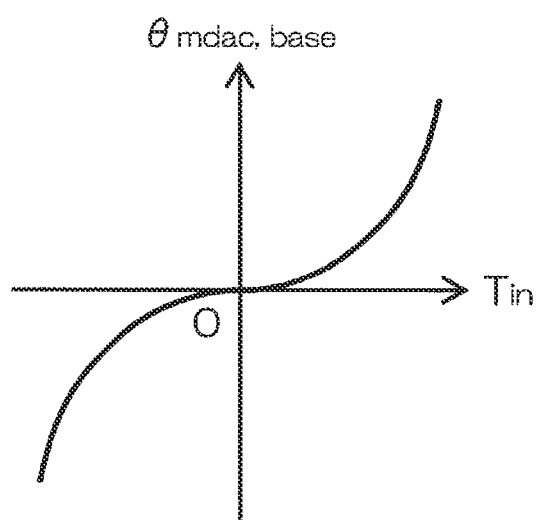
FIG. 15 is a graph illustrating a setting example of a basic manual steering command value $\theta_{mdac,base}$ relative to an input torque $T_{in}$.

In Expression (26), $\theta_{mdac,base}$ represents a basic manual steering command value set according to the input torque $T_{in}$ ($=T_b + T_{ac}$). FIG. 15 illustrates a setting example of the basic manual steering command value $\theta_{mdac,base}$ relative to the input torque $T_{in}$. The basic manual steering command value $\theta_{mdac,base}$ takes a positive value when the input torque $T_{in}$ is a positive value, and takes a negative value when the input torque $T_{in}$ is a negative value. The basic manual steering command value $\theta_{mdac,base}$ is set such that its absolute value increases as the absolute value of the input torque $T_{in}$ increases. The basic manual steering command value $\theta_{mdac,base}$ is calculated based on a preset map or a function $F(T_{in})$.

In Expression (26), G represents a correction gain for correcting the basic manual steering command value $\theta_{mdac,base}$, and is represented by, for example, Expression (27).

$$G = G_v \cdot G_{yr} \cdot G_{la} \cdot G_e \cdot G_d \quad (27)$$

Figure 16A:
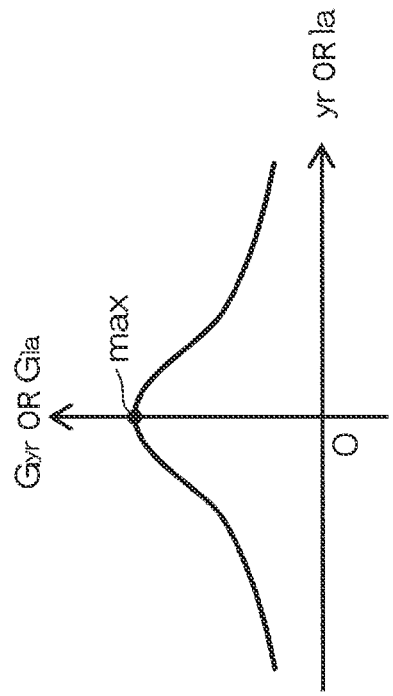
FIG. 16A is a graph illustrating a setting example of a correction gain $G_v$ based on the vehicle speed V.

The symbol $G_v$ represents a correction gain based on the vehicle speed V. The symbol $G_{yr}$ represents a correction gain based on the yaw rate yr. The symbol $G_{la}$ represents a correction gain based on the lateral acceleration la. The symbol $G_e$ represents a correction gain based on the danger level e. The symbol $G_d$ represents a correction gain based on the arousal level d. FIG. 16A is a graph illustrating a setting example of the correction gain $G_v$ based on the vehicle speed V. When the vehicle speed V is 0, the correction gain $G_v$ is set to a predetermined minimum value min ($=G_{v,min}$). When the vehicle speed V is V3 or −V3, the correction gain $G_v$ is set to a predetermined maximum value max ($=G_{v,max}$). In a range in which the absolute value of the vehicle speed V is equal to or smaller than V3, the correction gain $G_v$ is set to increase as the absolute value of the vehicle speed V increases. In a range in which the absolute value of the vehicle speed V is larger than V3, the correction gain $G_v$ is set to decrease as the absolute value of the vehicle speed V increases.

At a low speed at which the absolute value of the vehicle speed V is equal to or smaller than V3, the basic manual steering command value $\theta_{mdac,base}$ can be corrected such that the manual steering command value $\theta_{mdac}$ increases as the absolute value of the vehicle speed V increases. At a medium or high speed at which the absolute value of the vehicle speed V is larger than V3, the basic manual steering command value $\theta_{mdac,base}$ can be corrected such that the manual steering command value $\theta_{mdac}$ decreases as the absolute value of the vehicle speed V increases.

Figure 16B:
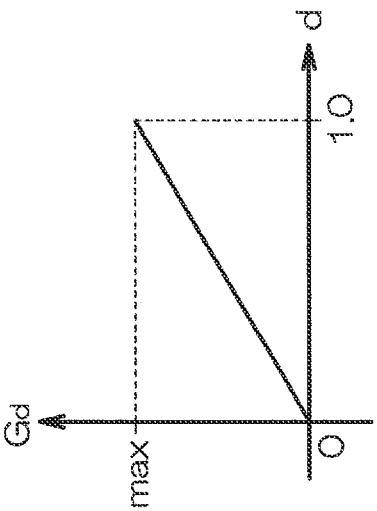
FIG. 16B is a graph illustrating setting examples of a correction gain $G_{yr}$ based on the yaw rate yr and a correction gain $G_{la}$ based on the lateral acceleration la.

FIG. 16B is a graph illustrating setting examples of the correction gain $G_{yr}$ based on the yaw rate yr and the correction gain $G_{la}$ based on the lateral acceleration la. When the yaw rate yr is 0, the correction gain $G_{yr}$ is set to a predetermined maximum value max ($=G_{yr,max}$). The correction gain $G_{yr}$ is set to decrease as the absolute value of the yaw rate yr increases. The setting example of the correction gain $G_{la}$ based on the lateral acceleration la is similar to the setting example of the correction gain $G_{yr}$ based on the yaw rate yr, and therefore its description is omitted.

Figure 16C:
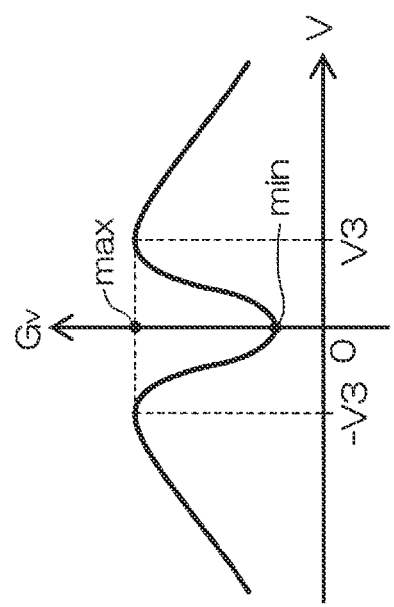
FIG. 16C is a graph illustrating a setting example of a correction gain $G_e$ based on the danger level e.

Thus, the basic manual steering command value $\theta_{mdac,base}$ can be corrected such that the manual steering command value $\theta_{mdac}$ decreases as the absolute value of the yaw rate yr or the lateral acceleration la increases. FIG. 16C is a graph illustrating a setting example of the correction gain $G_e$ based on the danger level e. When the danger level e is 0, the correction gain $G_e$ is set to a predetermined maximum value max ($=G_{e,max}$). When the danger level e is 1, the correction gain $G_e$ is set to 0. In a range in which the danger level e is 0 to 1, the correction gain $G_e$ is set to a smaller value as the danger level e increases. Thus, the basic manual steering command value $\theta_{mdac,base}$ can be corrected such that the manual steering command value $\theta_{mdac}$ decreases as the danger level e increases.

Figure 16D:
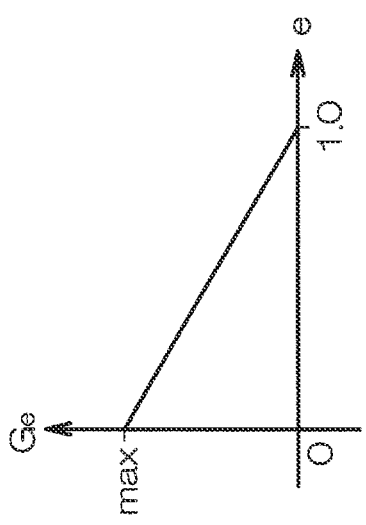
FIG. 16D is a graph illustrating a setting example of a correction gain $G_d$ based on the arousal level d.

FIG. 16D is a graph illustrating a setting example of the correction gain $G_d$ based on the arousal level d. When the arousal level d is 0, the correction gain $G_d$ is set to 0. When the arousal level d is 1, the correction gain $G_d$ is set to a predetermined maximum value max ($=G_{d,max}$). In a range in which the arousal level d is 0 to 1, the correction gain $G_d$ is set to a larger value as the arousal level d increases. Thus, the basic manual steering command value $\theta_{mdac,base}$ can be corrected such that the manual steering command value $\theta_{mdac}$ decreases as the arousal level d decreases.

In the third method, the correction gain G is set based on the five kinds of correction gains $G_v$, $G_{yr}$, $G_{la}$, $G_e$, and $G_d$. The correction gain G may be set based on any one correction gain selected from among the five kinds of correction gains, or any combination of two or more correction gains selected from among the five kinds of correction gains. For example, the correction gain G may be calculated based on Expression (28) or (29).

$$G = G_v \cdot G_{yr} \cdot G_e \tag{28}$$

$$G = G_v \cdot G_{la} \cdot G_d \tag{29}$$

In the first embodiment, the integrated angle command value $\theta_{acmd}$ is calculated by adding the manual steering command value $\theta_{mdac}$ to the automatic steering angle command value $\theta_{adac}$, and the electric motor 18 is controlled based on the integrated angle command value $\theta_{acmd}$. Thus, cooperative control in which the manual steering can be performed while the automatic steering control is being mainly performed can be achieved (i.e., realized) without switching the manual steering control and the automatic steering control. Further, transition can be seamlessly made between the manual steering control and the automatic steering control. Therefore, the driver does not feel discomfort when the driver performs the manual steering.

In the first embodiment, the manual steering command value $\theta_{mdac}$ is calculated using the vehicle information, the surrounding environment information, and the driver information as well as the torque caused by the driver (input torque $T_{in}$). Thus, it is possible to calculate the manual steering command value $\theta_{mdac}$ appropriate for the vehicle condition, the surrounding environment condition, and the driver's condition as well as the input torque $T_{in}$. Accordingly, the steering can be achieved more safely without causing discomfort as compared to a case where the manual steering command value $\theta_{mdac}$ is calculated based on the input torque $T_{in}$ alone.

Next, an electric power steering system according to a second embodiment of the disclosure is described. The overall configuration of the electric power steering system according to the second embodiment is similar to the overall configuration of the electric power steering system according to the first embodiment illustrated in FIG. 1. In the second embodiment, the configuration of the motor control ECU differs from that in the first embodiment.

Figure 17:
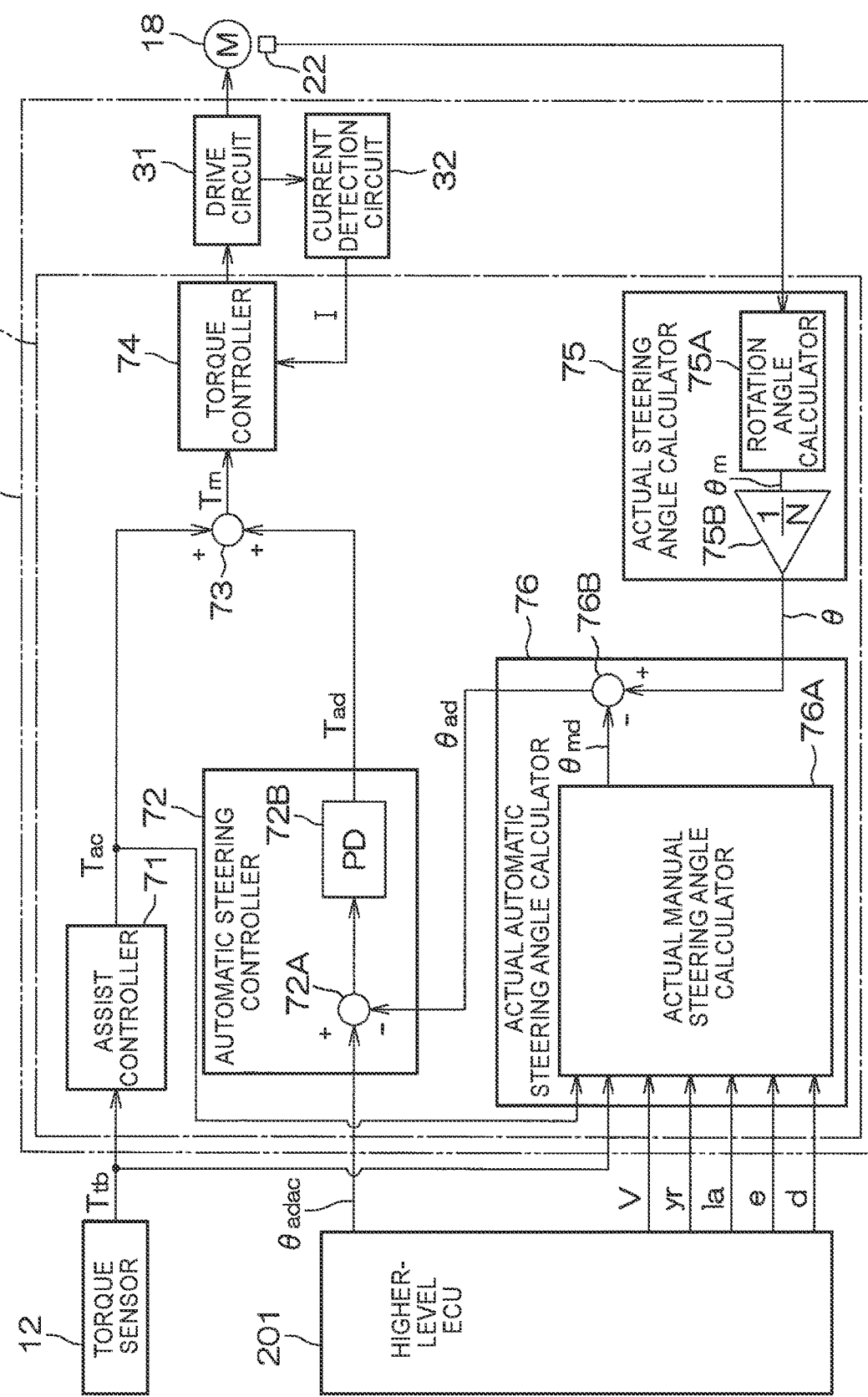
FIG. 17 is a block diagram for illustrating the electrical configuration of a motor control ECU according to a second embodiment.

FIG. 17 is a block diagram for illustrating the electrical configuration of a motor control ECU 202 according to the second embodiment. The motor control ECU 202 includes a microcomputer 70, the drive circuit (inverter circuit) 31, and the current detection circuit 32. The drive circuit 31 is controlled by the microcomputer 70, and supplies electric power to the electric motor 18. The current detection circuit 32 detects a current flowing through the electric motor 18 (hereinafter referred to as "motor current I").

The microcomputer 70 includes a CPU and memories (such as a ROM, a RAM, and a non-volatile memory). The microcomputer 70 functions as a plurality of functional processing units by executing a predetermined program. The functional processing units include an assist controller 71, an automatic steering controller 72, an integrated torque calculator (integrated control amount calculator) 73, a torque controller (controller) 74, an actual steering angle calculator 75, and an actual automatic steering angle calculator 76.

The assist controller 71 sets an assist torque command value (assist control amount) $T_{ac}$ that is a target value of an assist torque necessary for manual steering. The assist controller 71 sets the assist torque command value $T_{ac}$ based on the steering torque $T_{tb}$ detected by the torque sensor 12. A setting example of the assist torque command value $T_{ac}$ relative to the steering torque $T_{tb}$ is similar to the setting example of the assist torque command value $T_{ac}$ relative to the steering torque $T_{tb}$ in FIG. 5, and therefore its description is omitted.

The automatic steering controller 72 includes an angle deviation calculator 72A and a PD controller 72B. The angle deviation calculator 72A calculates a deviation $\Delta\theta$ ($=\theta_{adac} - \theta_{ad}$) between the automatic steering angle command value $\theta_{adac}$ supplied from the higher-level ECU 201 and an actual automatic steering angle $\theta_{ad}$ supplied from the actual automatic steering angle calculator 76. The PD controller 72B sets an automatic steering torque command value (automatic steering control amount) $T_{ad}$ necessary for automatic steering by performing proportional-derivative calculation (PD calculation) on the angle deviation $\Delta\theta$.

The integrated torque calculator 73 calculates an integrated torque command value (integrated control amount) $T_m$ by adding the automatic steering torque command value $T_{ad}$ to the assist torque command value $T_{ac}$. The torque controller 74 drives the drive circuit 31 through torque (current) feedback control such that the motor torque of the electric motor 18 is closer to (i.e., approaches) the integrated torque command value $T_m$. The actual steering angle calculator 75 calculates a rotation angle $\theta$ of the output shaft 9 based on a signal output from the rotation angle sensor 22. Specifically, the actual steering angle calculator 75 includes a rotation angle calculator 75A and a speed reducing ratio divider 75B. The rotation angle calculator 75A calculates a rotor rotation angle $\theta_m$ of the electric motor 18 based on a signal output from the rotation angle sensor 22. The speed reducing ratio divider 75B converts the rotor rotation angle $\theta_m$ calculated by the rotation angle calculator 75A into the rotation angle $\theta$ of the output shaft 9 (actual steering angle) by dividing the rotor rotation angle $\theta_m$ by the speed reducing ratio N of the speed reducer 19.

The actual steering angle $\theta$ includes a steering angle related to manual steering based on the steering torque $T_{tb}$ and the assist torque command value $T_{ac}$ (hereinafter referred to as "actual manual steering angle $\theta_{md}$"), and a steering angle related to automatic steering based on the automatic steering torque command value $T_{ad}$ (hereinafter referred to as "actual automatic steering angle $\theta_{ad}$"). The actual automatic steering angle calculator 76 calculates the actual automatic steering angle $\theta_{ad}$ based on the steering torque $T_{tb}$, the assist torque command value $T_{ac}$, and the actual steering angle $\theta$. Specifically, the actual automatic steering angle calculator 76 includes an actual manual steering angle calculator 76A and a subtractor 76B.

The actual manual steering angle calculator 76A calculates the actual manual steering angle $\theta_{md}$ based on a torque $T_{in}$ caused by the driver (input torque), vehicle information, surrounding environment information, and driver information. In this embodiment, the input torque $T_{in}$ is the sum ($T_{tb} + T_a$) of the steering torque $T_{tb}$ detected by the torque sensor 12 and the assist torque command value $T_{ac}$ set by the assist controller 71.

In this embodiment, the vehicle speed V, the yaw rate yr, and the lateral acceleration la supplied from the higher-level ECU 201 are used as the vehicle information. In this embodiment, the danger level e of the surrounding environment that is supplied from the higher-level ECU 201 is used as the surrounding environment information. In this embodiment, the arousal level d of the driver that is supplied from the higher-level ECU 201 is used as the driver's condition. The actual manual steering angle calculator 76A calculates the actual manual steering angle $\theta_{md}$ by a method similar to the method (first method, second method, or third method) for calculating the manual steering command value $\theta_{mdac}$ by the command value setting unit 62 (see FIG. 4) in the first embodiment. In other words, the actual manual steering angle calculator 76A may calculate, as the actual manual steering angle $\theta_{md}$, the manual steering command value $\theta_{mdac}$ calculated by the command value setting unit 62 in the first embodiment.

At this time, the manual steering command value $\theta_{mdac}$ used in the first method, the second method, and the third method is replaced with the actual manual steering angle $\theta_{md}$. The basic manual steering command value $\theta_{mdac,base}$ used in the third method is replaced with a basic actual manual steering angle $\theta_{md,base}$. The actual manual steering angle calculator 76A is an example of the "steering angle calculator" of the disclosure. The subtractor 76B calculates the actual automatic steering angle $\theta_{ad}$ by subtracting the actual manual steering angle $\theta_{md}$ calculated by the actual manual steering angle calculator 76A from the actual steering angle $\theta$ calculated by the actual steering angle calculator 75. The actual automatic steering angle $\theta_{ad}$ is supplied to the automatic steering controller 72.

In the second embodiment, the actual automatic steering angle calculator 76 calculates the actual automatic steering angle $\theta_{ad}$ that is included in the actual steering angle $\theta$. The actual automatic steering angle $\theta_{ad}$ is the steering angle based on the automatic steering control. Since the actual automatic steering angle $\theta_{ad}$ used for setting the automatic steering torque command value $T_{ad}$ (automatic steering control amount) does not include the steering angle based on the manual steering (i.e., the steering angle based on (related to) the manual steering and the assist control), an appropriate automatic steering control amount is set even when the manual steering is performed during the automatic steering control. Thus, appropriate automatic steering control can be performed.

The electric motor 18 is controlled based on the integrated torque command value $T_m$ calculated by adding the target assist torque command value $T_{ac}$ to the automatic steering torque command value $T_{ad}$. Therefore, it is possible to perform (i.e., it is possible to realize) the assist control in accordance with the manual steering while mainly performing the automatic steering control. Thus, both the automatic steering control and the assist control in accordance with the manual steering can be performed simultaneously, and transition can be seamlessly made between the automatic steering control and the assist control.

In the second embodiment, the actual manual steering angle $\theta_{md}$ is calculated using the vehicle information, the surrounding environment information, and the driver information as well as the torque caused by the driver (input torque $T_{in}$). Thus, it is possible to calculate the actual manual steering angle $\theta_{md}$ appropriate for the vehicle condition, the surrounding environment condition, and the driver's condition as well as the input torque $T_{in}$. Accordingly, the steering can be achieved more safely without causing discomfort as compared to a case where the actual manual steering angle $\theta_{md}$ is calculated based on the input torque $T_{in}$ alone.

Although the first and second embodiments of the disclosure are described above, the disclosure may be carried out by other embodiments. In the first and second embodiments, the sum ($T_{tb}+T_{ac}$) of the steering torque $T_{tb}$ detected by the torque sensor 12 and the assist torque command value $T_{ac}$ set by the assist torque command value setting unit 61 (or the assist controller 71) is used as the input torque $T_{in}$. The steering torque $T_{tb}$ or the assist torque command value $T_{ac}$ alone may be used as the input torque $T_{in}$.

In addition, various design changes may be made within the scope of the disclosure.

What is claimed is:

1. A motor control apparatus configured to control driving of an electric motor for steering angle control, the motor control apparatus comprising:
   a steering angle calculation apparatus comprising:
      an electronic control unit configured to:
         calculate a manual steering angle based on a torque caused by a driver and an equation of motion;
         generate a manual steering command value;
         instruct the electric motor to set the manual steering angle as the manual steering command value;
         calculate an integrated angle command value by adding the manual steering command value to an automatic steering angle command value; and
         perform angle control for the electric motor based on the integrated angle command value, wherein:
   the equation of motion is for calculating the manual steering angle using the torque caused by the driver and a road load torque;
   the road load torque is set based on at least one of road information and driver information;
   the equation of motion includes a spring component and a viscosity component for generating the road load torque;
   the spring component is set by correcting a basic spring component based on at least one of vehicle information, surrounding environment information and the driver information; and
   the viscosity component is set by correcting a basic viscosity component based on the at least one of the vehicle information, the surrounding environment information and the driver information.

2. The steering angle calculation apparatus according to claim 1, wherein:
   the basic spring component has a linear characteristic defined by a predetermined spring constant relative to the manual steering angle; and
   the basic viscosity component has a linear characteristic defined by a predetermined viscosity coefficient relative to a steering speed.

3. A motor control apparatus configured to control driving of an electric motor for steering angle control, the motor control apparatus comprising:
   a steering angle calculation apparatus comprising:
      an electronic control unit configured to:
         calculate a manual steering angle by correcting, based on at least one of vehicle information, surrounding environment information and driver information, a basic steering angle set in accordance with torque caused by a driver;
         generate a manual steering command value;
         calculate an integrated angle command value by adding the manual steering command value to an automatic steering angle command value; and
         perform angle control for the electric motor based on the integrated angle command value; and
         instruct the electric motor to set the manual steering angle as the manual steering command value; and
         set the manual steering angle.

4. A motor control apparatus comprising:
   a torque sensor configured to detect a steering torque;
   a steering angle sensor configured to detect an actual steering angle; and a steering angle calculation apparatus comprising:
an electronic control unit configured to:
- calculate a steering angle based on a torque caused by a driver and at least one of vehicle information, surrounding environment information, and driver information;
- set an automatic steering control amount;
- set an assist control amount using the steering torque;
- calculate an integrated control amount by summing the automatic steering control amount and the assist control amount;
- perform torque control for an electric motor for steering angle control based on the integrated control amount;
- calculate an actual manual steering angle included in the actual steering angle, the actual manual steering angle being based on manual steering and assist control;
- calculate an actual automatic steering angle by subtracting the actual manual steering angle from the actual steering angle;
- set the automatic steering control amount using an automatic steering angle command value and the actual automatic steering angle; and
- instruct the electric motor to set the steering angle as the actual manual steering angle.

* * * * *